United States Patent
Yoneyama et al.

(10) Patent No.: US 7,345,814 B2
(45) Date of Patent: Mar. 18, 2008

(54) MICROSCOPE SYSTEM AND MICROSCOPE FOCUS MAINTAINING DEVICE FOR THE SAME

(75) Inventors: Takashi Yoneyama, Sagamihara (JP); Atsuhiro Tsuchiya, Hachioji (JP); Kenichi Koyama, Sagamihara (JP)

(73) Assignee: Olympus Corporation, Tokyo (JP)

( * ) Notice: Subject to any disclaimer, the term of this patent is extended or adjusted under 35 U.S.C. 154(b) by 249 days.

(21) Appl. No.: 10/951,175

(22) Filed: Sep. 27, 2004

(65) Prior Publication Data

US 2005/0068614 A1 Mar. 31, 2005

(30) Foreign Application Priority Data

| | | |
|---|---|---|
| Sep. 29, 2003 | (JP) | 2003-338489 |
| Sep. 30, 2003 | (JP) | 2003-342088 |
| Jul. 8, 2004 | (JP) | 2004-202040 |

(51) Int. Cl.
*G02B 21/00* (2006.01)
(52) U.S. Cl. ................ 359/383; 250/201.3
(58) Field of Classification Search .......... None
See application file for complete search history.

(56) References Cited

U.S. PATENT DOCUMENTS

| | | | | |
|---|---|---|---|---|
| 3,620,596 | A * | 11/1971 | Binnings | 359/398 |
| 5,989,835 | A * | 11/1999 | Dunlay et al. | 435/7.2 |
| 6,285,498 | B1 * | 9/2001 | Mayer | 359/392 |
| 6,542,293 | B2 * | 4/2003 | Yahiro | 359/383 |
| 2005/0179899 | A1 * | 8/2005 | Palti-Wasserman et al. | 356/417 |

FOREIGN PATENT DOCUMENTS

| | | |
|---|---|---|
| JP | 58-83906 A | 5/1983 |
| JP | 6-78112 A | 3/1994 |
| JP | 8-82747 A | 3/1996 |
| JP | 11-095091 A | 4/1999 |
| JP | 2001-91821 A | 4/2001 |
| JP | 2001-255260 A | 9/2001 |
| WO | WO 03077008 A2 * | 9/2003 |

OTHER PUBLICATIONS

Wikipedia: "Transistor-transistor Logic", http://en.wikipedia.org/w/index.php?title=Transistor-transistor_logic&oldid=792613, revised Nov. 26, 2002, retrieved from the web on Nov. 20, 2006.*

* cited by examiner

*Primary Examiner*—Stephone B. Allen
*Assistant Examiner*—Derek S. Chapel
(74) *Attorney, Agent, or Firm*—Frishauf, Holtz, Goodman & Chick, P.C.

(57) ABSTRACT

A microscope system has a stage on which an observation sample, including an observation object and a transparent member, is to be placed. An objective lens is placed to face the observation sample placed on the stage, and a focusing unit moves at least one of the stage and the objective lens to perform a focusing operation. An autofocus unit controls a focusing driving unit by a so-called Through-the-Lens: TTL system. After autofocus is performed for the transparent member by the autofocus unit, the focusing driving unit makes at least one of the stage and the objective lens move by a predetermined constant amount.

19 Claims, 26 Drawing Sheets

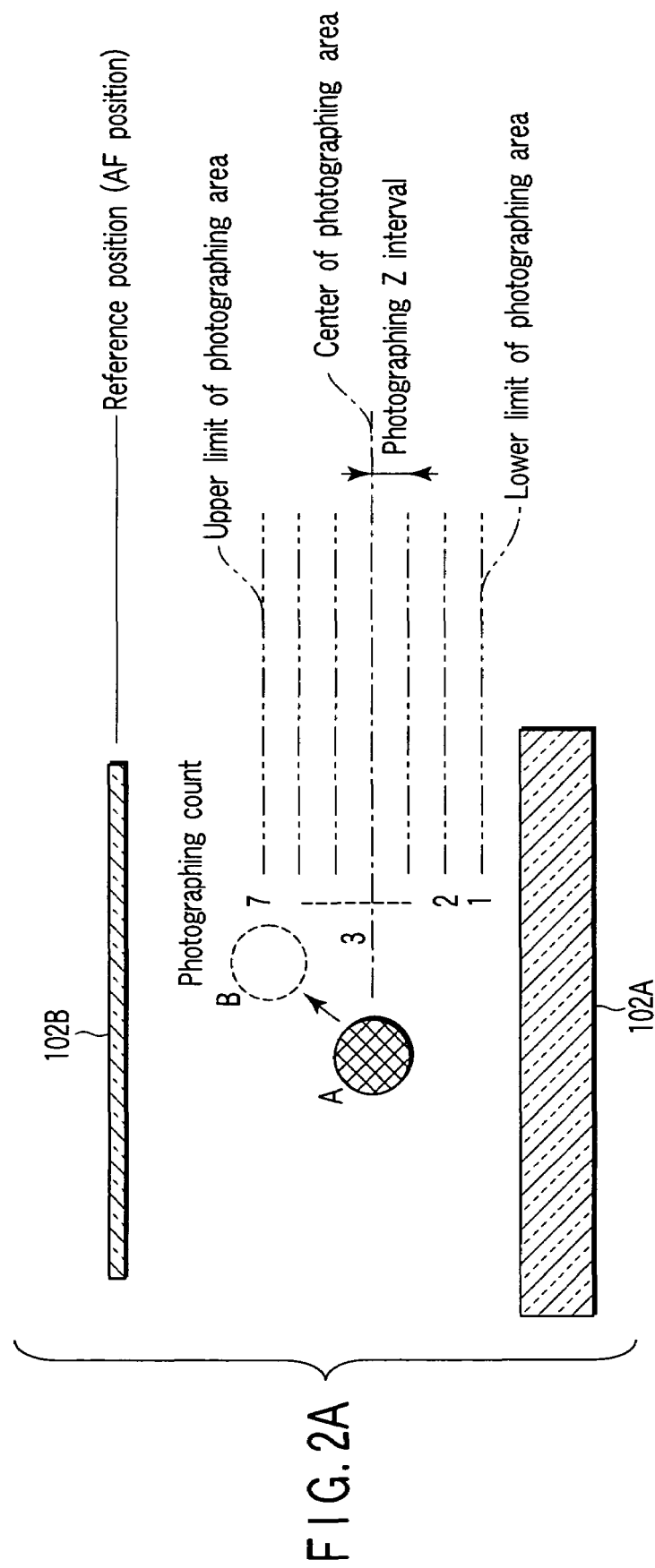
F I G. 2A

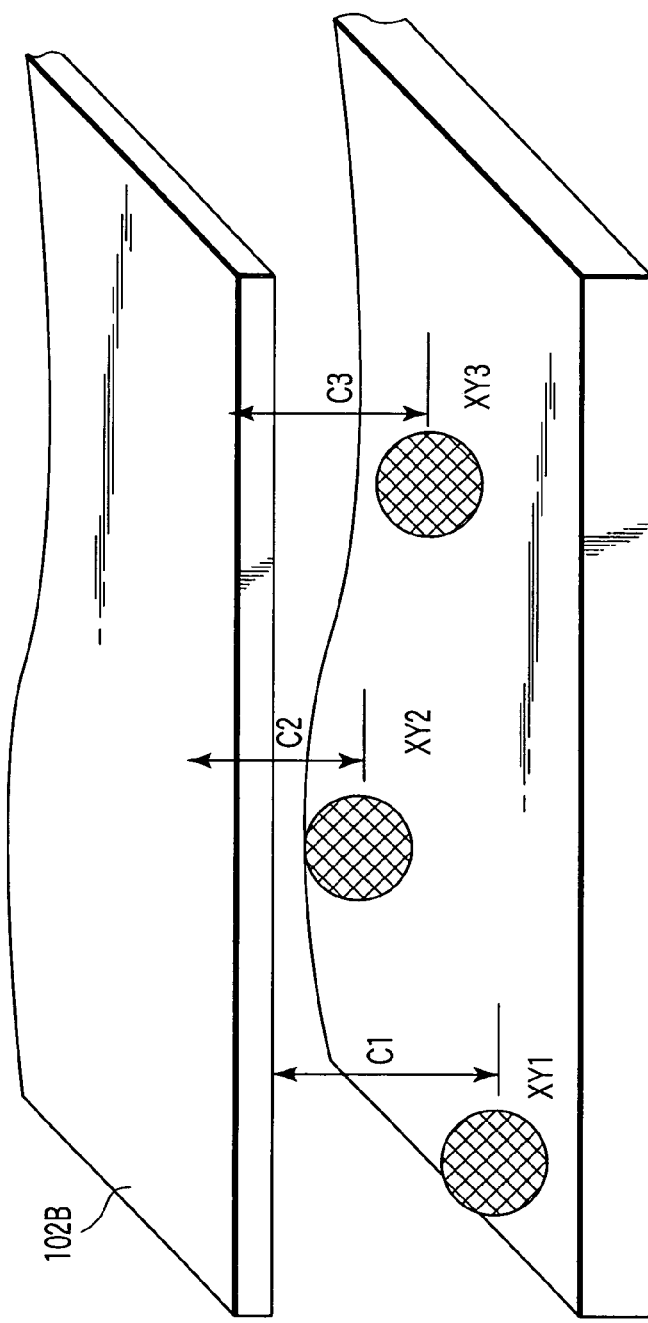
F I G. 5
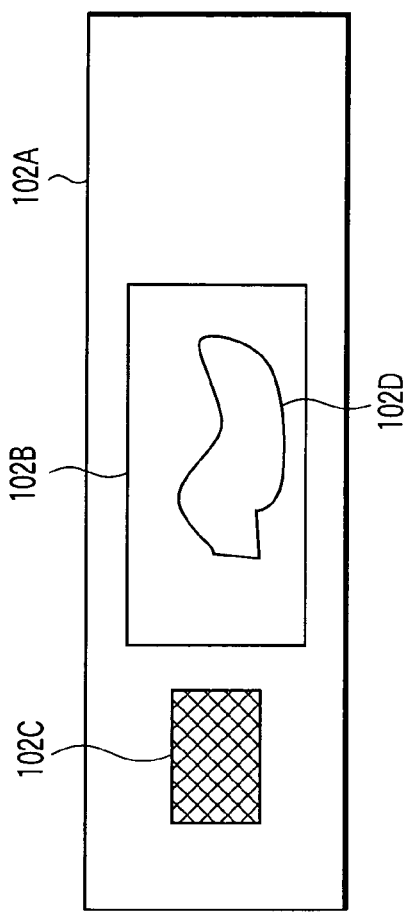
F I G. 10

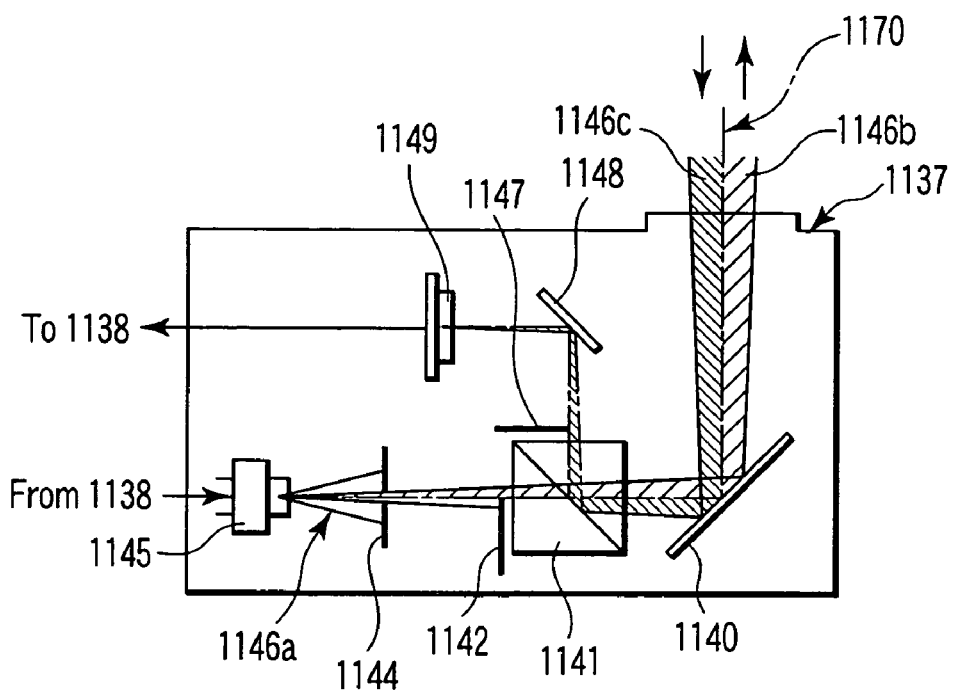
F I G. 26A
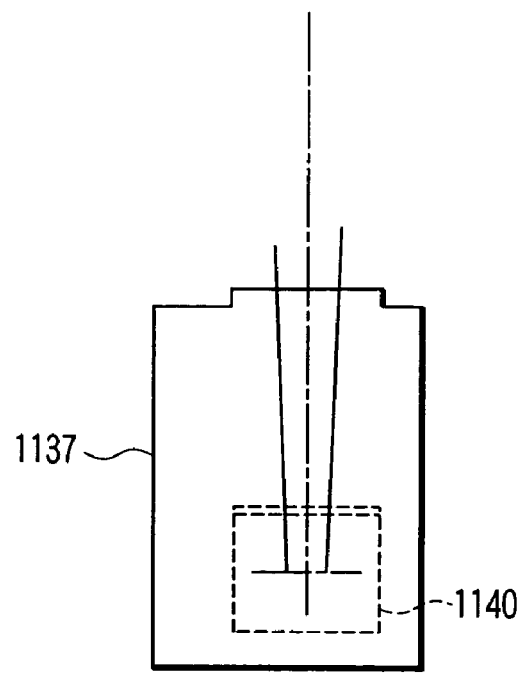
F I G. 26B

MICROSCOPE SYSTEM AND MICROSCOPE FOCUS MAINTAINING DEVICE FOR THE SAME

CROSS-REFERENCE TO RELATED APPLICATIONS

This application is based upon and claims the benefit priority from prior Japanese Patent Applications No. 2003-338489, filed Sep. 29, 2003, No. 2003-342088, filed Sep. 30, 2003; and No. 2004-202040, filed Jul. 8, 2004, the entire contents of all of which are incorporated herein by reference.

BACKGROUND OF THE INVENTION

1. Field of the Invention

The present invention relates to a microscope system used for, for example, an apparatus which automatically examines a specimen and automatically records an image of the specimen by using a microscope.

2. Description of the Related Art

Recently, as the automation of various functions of an examining apparatus using a microscope has progressed, an autofocus function of focusing on a specimen has become an indispensable function to be automated.

Microscope autofocus is also used for an examining apparatus for a specimen encapsulated in a slide glass. For example, Jpn. Pat. Appln. KOKAI Publication No. 58-83906 discloses a method of forming an infrared reflecting film on a slide glass or cover glass in which a specimen is encapsulated, and focusing on the film. The composition of an infrared reflecting film is, in particular, disclosed in Jpn. Pat. Appln. KOKAI Publication No. 8-82747. In addition, Jpn. Pat. Appln. KOKAI Publication No. 2001-91821 discloses a method of accurately focusing on a specimen by using a passive AF scheme after focusing on a slide glass or cover glass by using an active AF scheme.

BRIEF SUMMARY OF THE INVENTION

A microscope system according to the present invention includes a stage on which an observation sample, including an observation object and a transparent member, is to be placed, an objective lens which is placed to face the observation sample placed on the stage, a focusing unit which moves at least one of the stage and the objective lens to perform a focusing operation, and an autofocus unit which controls a focusing driving unit by a so-called Through-the-Lens: TTL system, wherein after autofocus is performed for the transparent member by the autofocus unit, the focusing driving unit makes at least one of the stage and the objective lens move by a predetermined constant amount.

Advantages of the invention will be set forth in the description which follows, and in part will be obvious from the description, or may be learned by practice of the invention. Advantages of the invention may be realized and obtained by means of the instrumetalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a view showing a time lapse model for long-time observation of the movement of an observation object;

FIG. 5 is a view showing a model having measurement points in an observation object encapsulated between a slide glass and a cover glass;

FIG. 10 is a view showing a slide glass model in a microscope system according to the fifth embodiment of the present invention;

FIG. 26A is a plan view of a sensor head shown on the right side of FIG. 25;

FIG. 26B is a front view of the sensor head shown in FIG. 26A; and

DETAILED DESCRIPTION OF THE INVENTION

The embodiments of the present invention will be described below with reference to the views of the accompanying drawing.

Microscope System

An embodiment of a microscope system will be described first.

First Embodiment

Figure 1:
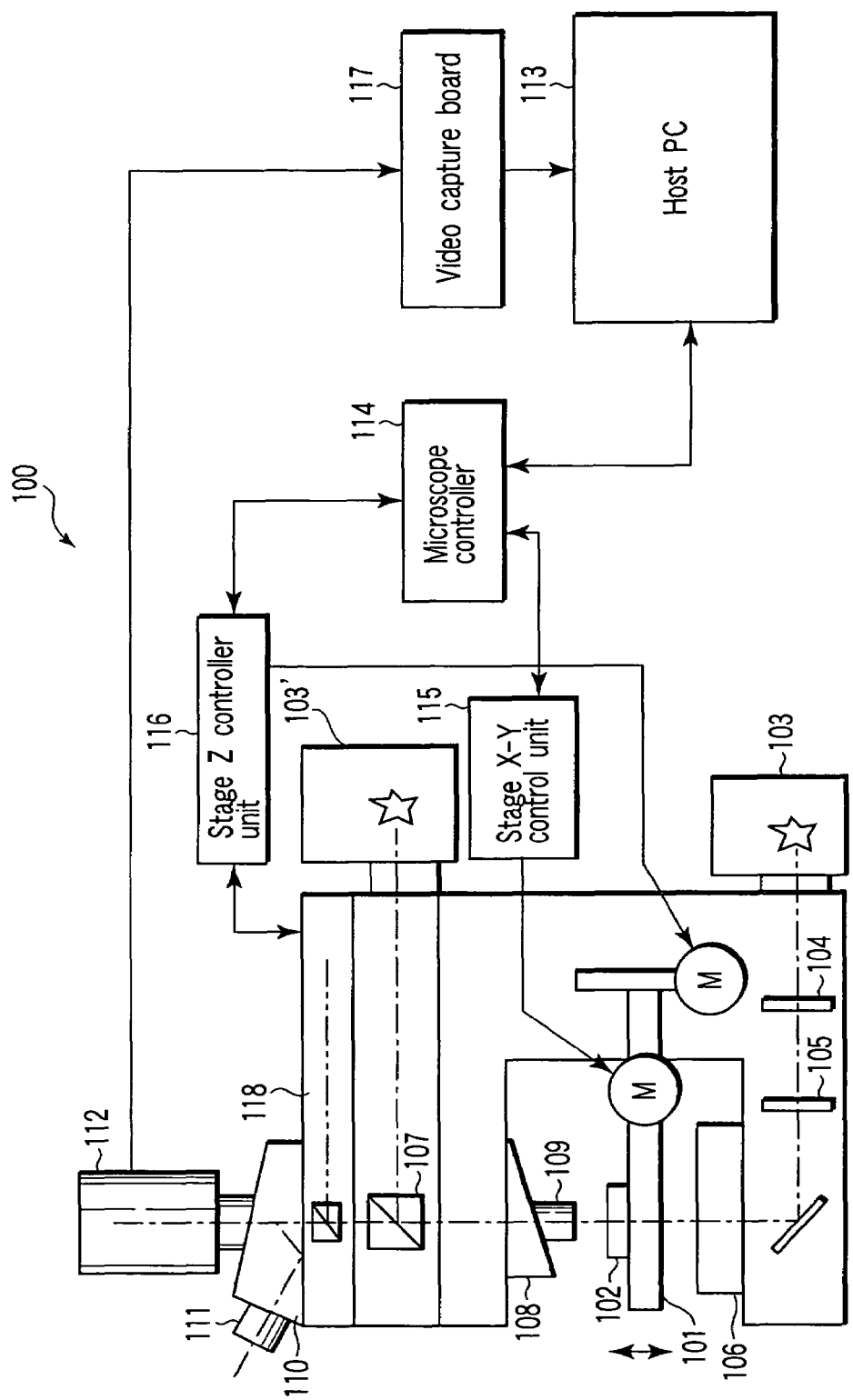
FIG. 1 is a block diagram showing the arrangement of a microscope system according to the first embodiment of the present invention.

This embodiment is directed to a microscope system including an upright microscope. FIG. 1 shows the arrangement of the microscope system according to the first embodiment. As shown in FIG. 1, a microscope system 100 according to this embodiment comprises a stage 101 on which an observation sample 102 is placed, and an objective lens 109 which is placed to face the observation sample 102 placed on the stage 101.

The objective lens 109 is mounted on a revolver 108. The revolver 108 can be motor-driven and controlled. The objective lens 109 with a desired magnification can be placed on the optical path by controlling the rotation of the revolver 108 using a revolver driving control unit (not shown).

The position of the stage 101 in the X-Y-Z direction can be motor-driven and controlled. The microscope system 100 comprises a stage X-Y control unit 115 which controls the position of the stage 101 in the X-Y direction, and a stage Z control unit 116 which controls the position of the stage 101 in the Z direction. The stage Z control unit 116 forms a focusing unit which moves at least one of the stage and the objective lens to perform focusing operation.

For example, as shown in FIG. 2A, the observation sample 102 comprises a slide glass 102A, a cover glass 102B, and an observation object encapsulated between them. The observation object comprises, for example, a specimen (e.g., a cell) and a culture solution. The observation object is positioned between the slide glass 102A and the cover glass 102B, and the objective lens 109 is positioned above the cover glass 102B.

Referring back to FIG. 1, the microscope system 100 comprises a known active type autofocus unit 118 for a microscope. The autofocus unit 118 controls the focusing driving unit, i.e., the stage Z control unit 116, by the so-called Through-the-Lens: TTL system. That is, the autofocus unit 118 optically detects, through the objective lens 109, the focus position of an observation optical system including the objective lens 109, and sends the resultant information to the stage Z control unit 116. The stage Z control unit 116 moves the observation sample 102 to the focus position in accordance with information from the autofocus unit 118.

The microscope system 100 further comprises a light source 103 for transmitted illumination of the observation sample 102 or a light source 103' for fluorescence illumination of the observation sample 102. In transmitted observation, illumination light from the light source 103 is applied to the observation sample 102 through an ND filter 104 for light attenuation, a field stop (FS) 105, and a condenser 106 incorporating an aperture stop (AS). In fluorescence observation, illumination light from the light source 103' is returned back by a fluorescence cube 107 and applied as excitation light to the observation sample 102. Each optical element is motor-driven by a corresponding driving control unit (not shown) to perform optical element conversion. With this arrangement, the illumination optical system for fluorescence observation including the light source 103' and fluorescence cube 107 can selectively apply excitation light beams having different wavelengths. In other words, the illumination optical system for fluorescence observation can select excitation light.

A transmitted illumination image or fluorescence image from the observation sample 102 passes through the objective lens 109 and is partly guided to an eyepiece lens 111 through a lens barrel 110. The remaining light beams enter a TV camera 112.

The microscope is controlled by a host PC 113 through a microscope controller 114. The microscope controller 114 performs actual driving control on the portions to be motor-driven and controlled through the corresponding control units.

The light source 103, ND, AS, and FS can be controlled by the corresponding control units (not shown) from the microscope controller 114; the light source voltage, stop diameter, and the like are controlled.

An image of the observation sample 102 sensed by the TV camera 112 is acquired by the host PC 113 through a video capture board 117. The host PC 113 can store acquired images in an image memory (not shown).

FIG. 2A shows a so-called time lapse model for long-time observation of the movement of a specimen. FIG. 2A indicates that the specimen (or a specific region such as a nucleus in the specimen) in the observation object encapsulated between the slide glass 102A and the cover glass 102B moves from a position A to a position B in a long period of time. Observation is performed by performing photography at intermittent intervals at the positions indicated by the chain double-dashed lines from the upper limit of the photographing area to its lower limit while moving the stage from the photographing area center position indicated by the chain line in FIG. 2A by a predetermined amount in the Z direction.

Figure 3:
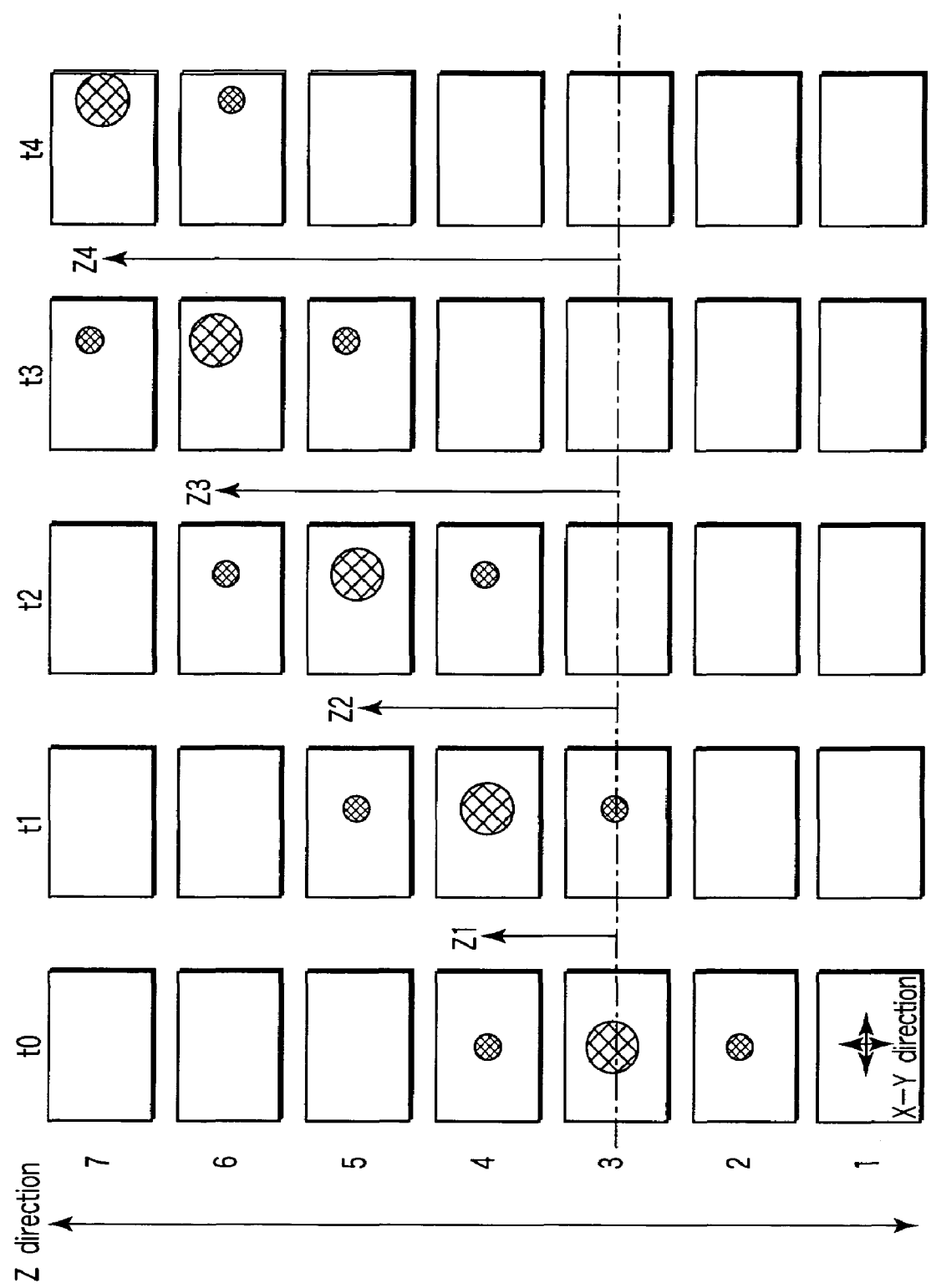
FIG. 3 is a view showing a model of observation images photographed during a predetermined photographing period.

FIG. 3 shows an observation image model obtained by performing photography during a period from photographing time t0 to photographing time t4 under the above conditions. Referring to FIG. 3, each image information in the vertical axis direction indicates the distance the specimen indicated by the crosshatched circle has moved, i.e., indicates that the specimen has moved a distance Z4 from t0 to t4. Likewise, the X-Y position in each image indicates that the specimen has moved in the X-Y direction. The model shown in FIG. 3 indicates that the specimen located in the center of the image at t0 has moved to the right until t4.

Figure 2B:
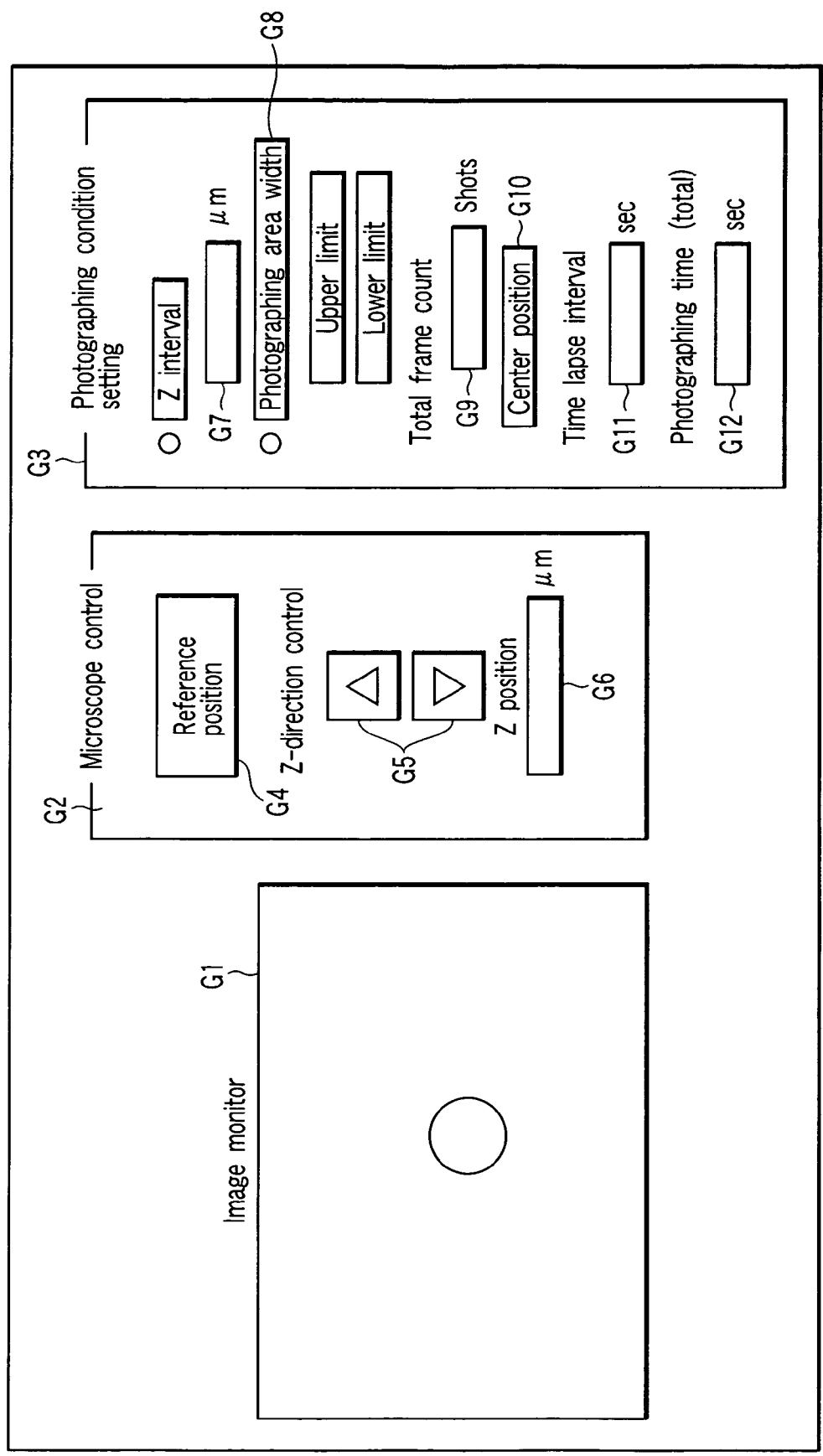
FIG. 2B is a view showing a setting window of a host PC in the microscope system according to the first embodiment of the present invention.

FIG. 2B shows the setting window of the host PC 113 in the microscope system 100, which is used to perform the above photographing operation. The setting window comprises a portion G1 which displays a specimen image from the TV camera 112, an operation display portion G2 associated with control on the microscope, and a display portion G3 for setting photographing conditions for a specimen image.

The photographing condition setting method will be described with reference to FIGS. 2A and 2B.

In setting photographing conditions, first of all, a button G4 is pressed to perform autofocus (AF) for the slide glass 102A or cover glass 102B. FIG. 2A shows a case wherein AF is performed for the cover glass 102B. When AF is complete, the stage 101 is located at the reference position in FIG. 2A. An observer operates a button G5 to vertically drive the stage 101 so as to focus on a specimen as a photographing target. A portion G6 is displaying the address of the current stage position, from which the distance from the position of the cover glass (the position where AF is complete) to the position of the specimen can be read. After the specimen is brought into focus, a button G10 is pressed to register a photographing area center position like photographing count 3 in FIG. 2A in the Z direction of the stage at which photography is to be performed. The distance between this cover glass position and the center position becomes an offset. After the photographing area center position is registered, buttons G7 and G8 are operated to set a pitch and frame count in the Z direction of the stage for Z-direction slice photography for the specimen like those indicated by a photographing Z interval and photographing count in FIG. 2A. A frame count and pitch can also be set by setting a range and frame count in the Z direction in which photography is performed. In this case, a button G8 and the button G9 are operated to make settings. If a ranged in the Z direction in which photography is performed is set beyond the slide glass 102A or cover glass 102B, warning display is performed against the set conditions. After a Z photographing count and two-direction pitch are set, a time interval for photography is set by using a button G11, and a photographing period is set by using a button G12. If a photographing interval is set to be shorter than the photographing time in the Z direction set with the buttons G7 and G9, warning display is performed against the set photographing interval.

In this embodiment, after autofocus is performed for the cover glass 102B, the position of the photographing target is set. However, the same effect can be obtained by performing autofocus for the cover glass 102B after the position of the photographing target is set.

Figure 4:
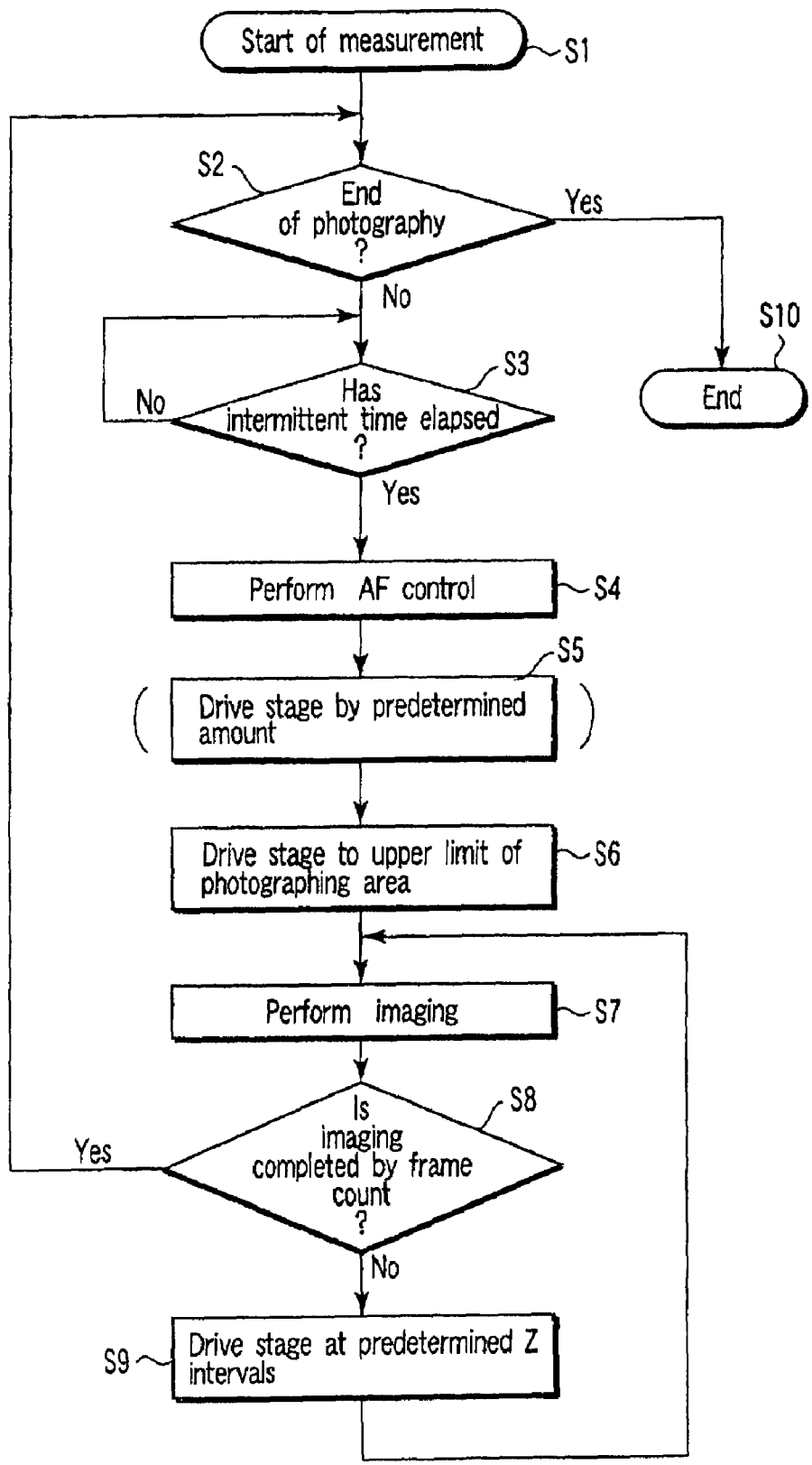
FIG. 4 is a flowchart showing the operation of the microscope system according to the first embodiment of the present invention.

The operation of the microscope system 100 set in the above manner will be described with reference to FIG. 4.

When measurement is started (S1), it is checked whether photography is completed by a predetermined frame count and time lapse measurement corresponding to the photographing time (total) set by the host PC is completed (S2). If the measurement is completed, the processing is terminated (S10). If the measurement is not completed, the system is set in the standby state until the time lapse measurement interval set by the time lapse interval set by the host PC is reached (S3).

When the measurement interval is reached, AF control is performed for the cover glass 102B to control the position of the cover glass 102B to the reference position shown in FIG. 2A (S4). After the cover glass 102B is positioned at the reference position, the stage 101 is driven to the photographing area center position set in advance by the host PC, i.e., by the offset amount (S5).

That is, after the autofocus unit 118 performs autofocus for the cover glass 102B, the stage Z control unit 116 moves the stage 101 by a predetermined constant amount, i.e., an offset amount.

In order to acquire a Z-direction image, the stage 101 is driven to the upper limit of the photographing area (S6), and photography is performed (S7). Of the operations in steps S5 and S6, the operation in step S5 can be omitted (internally processed) by calculating the upper limit of the photographing area in advance from the set value of the photographing area center position. In these driving operations, in order to minimize a position shift due to so-called backlash, position control is preferably performed in one direction.

After the photographing is performed, photography is performed by the frame count set by the host PC while the stage is driven by the photographing Z interval set by the host PC (S8, S9). This operation is repeated until measurement is finished (S2).

The microscope system 100 of this embodiment which has the above arrangement and is controlled in the above manner can reliably measure the movement of a specimen because a specimen photographing position is set with an offset by performing autofocus for the cover glass 102B while a reference position is fixed even if the objective lens focus position changes with a change in ambient temperature.

The microscope system 100 of this embodiment is configured to vertically move the stage 101. However, the system may be configured to vertically move the objective lens 109. In this case as well, similar effects can be obtained. In addition, in the microscope system 100 of this embodiment, the microscope is an upright microscope. However, a so-called inverted microscope may be used, which has an objective lens placed below the stage 101. In this case as well, similar effects can be obtained. In this embodiment, an active type autofocus system is used. However, a known passive type autofocus system may be used. In this case as well, similar effects can be obtained.

Various modifications can be made to this embodiment without departing from the object of the embodiment, i.e., temporarily performing autofocus for the cover glass 102B or slide glass 102A, then driving the stage by a predetermined amount, and performing photography.

In this embodiment, the stage 101 need not be capable of moving in the X-Y direction. That is, the stage 101 may be capable of moving in only the Z direction, and the stage X-Y control unit 115 may be omitted. In addition, the objective lens 109 need not be interchangeable. That is, the microscope need not have the function of a revolver capable of rotatably holding objective lenses and selectively placing one of them on an optical path.

Second Embodiment

This embodiment is directed to time lapse measurement for measurement points differing in X-Y position. Since the arrangement of a microscope system of this embodiment is the same as that of the first embodiment, a description thereof will be omitted. In this embodiment, offset driving operation is performed at each X-Y position of a specimen.

FIG. 5 shows a model having measurement points XY1, XY2, and XY3 in an observation object encapsulated between a slide glass 102A and a cover glass 102B. In this model, the measurement points XY1, XY2, and XY3 have different Z-direction positions C1, C2, and C3 with respect to the cover glass 102B. The following is a sequence for time lapse measurement on the movement of each measurement point.

Figure 6:
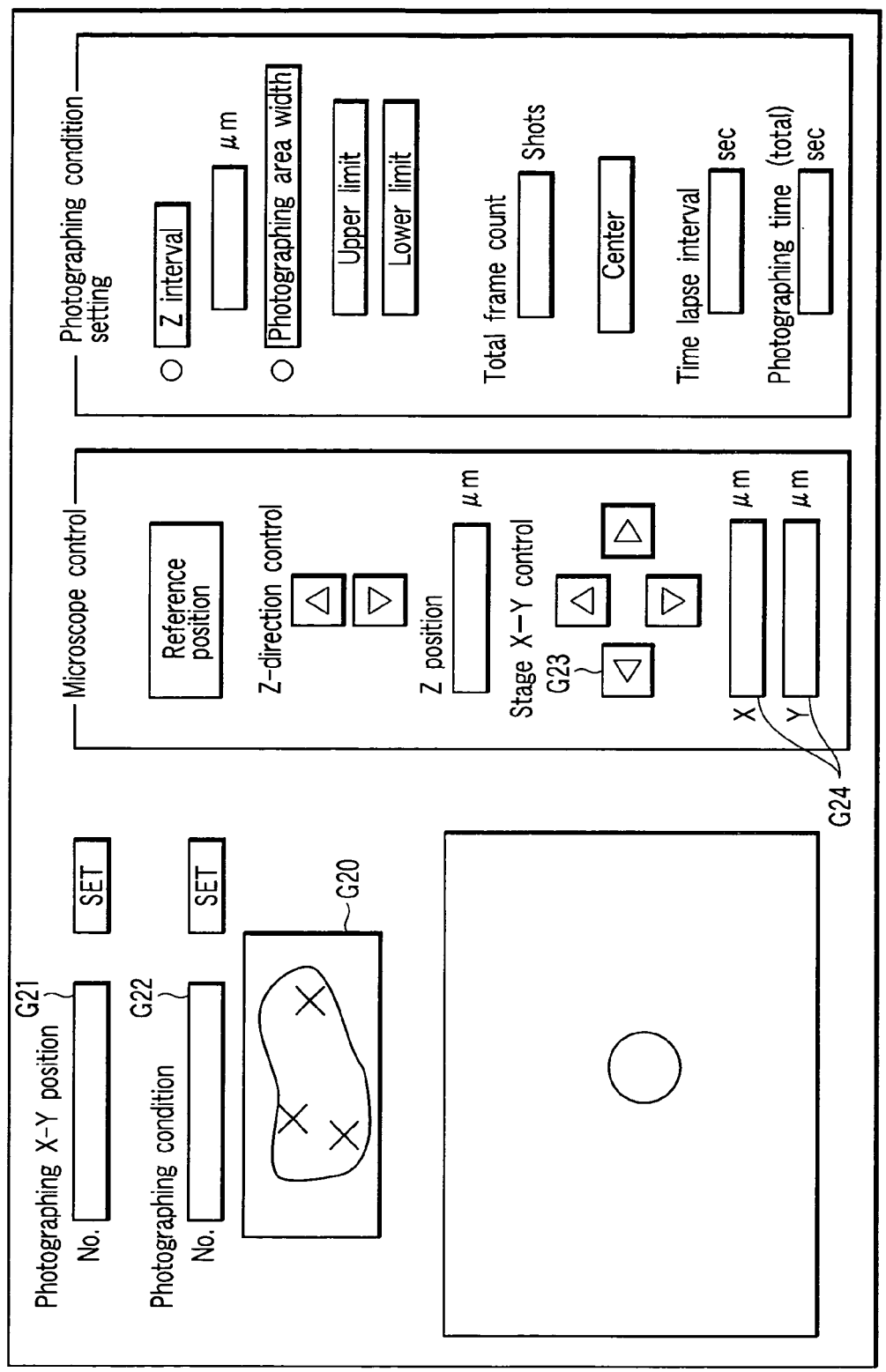
FIG. 6 is a view showing a host PC setting window in a microscope system according to the second embodiment of the present invention.

FIG. 6 shows a host PC setting window for setting offset driving for each X-Y position in this embodiment. As compared with the first embodiment, several functions are added to this setting window. The added functions will be described.

Reference symbol G20 denotes an overall image of the slide glass 102A. An observer operates a button G23 to move a stage 101 in the X-Y direction to determine measurement points, e.g., nuclei, for time lapse observation. The X-Y position information of the stage 101 is displayed on a portion G24. Measurement points are determined by operation a button G21 while the X-Y position of the stage is fixed. When position setting is done, the registered measurement points are indicated by crosses in the overall observation object image G20. The offset amounts of the respective measurement points and photographing conditions are set in the same sequence as that in the first embodiment. Assume that the same photographing conditions as those which have already been registered for other measurement points are to be set. In this case, registering the photographing conditions allows the observer to call them by operating a button G22 and can unify photographing conditions for all measurement points or specific measurement points.

The operation of the microscope system for which settings have been made in the above manner will be described with reference to FIG. 7.

When measurement is started (S20), it is checked whether photography is completed by a predetermined frame count, and time lapse measurement corresponding to the photographing time (total) set by the host PC is finished (S21). If the measurement is finished, the processing is terminated (S31). If the measurement is not finished, the system is set in the standby state until the time lapse measurement interval set by the time lapse interval set by the host PC is reached (S22).

When the measurement interval is reached, the stage is driven in the X-Y direction to set measurement points (S23). When the stage is driven to the stage X-Y position of each measurement point, AF control is performed for the cover glass 102B at the stage X-Y position to control the position of the cover glass 102B to the reference position (S24). After the cover glass 102B is positioned at the reference position, the stage 101 is driven to each photographing center area position set in advance by the host PC, i.e., by an offset amount (S25).

That is, after an autofocus unit 118 performs autofocus for the cover glass 102B, a stage Z control unit 116 moves the stage 101 by a predetermined constant amount, i.e., an offset amount.

The stage is further driven to the upper limit of the photographing area to acquire a Z-direction image (S26), and photography is performed (S27). Of the operations in steps S25 and S26, the operation in step S25 can be omitted (internally processed) by calculating the upper limit of the photographing area in advance from the set value of the photographing area center position as in the first embodiment.

After the photographing is performed, photography is performed by the frame count set by the host PC while the stage is driven by the photographing Z interval set by the host PC (S28, S29). This operation is repeated until photography is complete at all the measurement points and the time lapse measurement finish conditions are satisfied (S30, S31).

The microscope system of this embodiment which has the above arrangement and is controlled in the above manner can reliably measure the movement of a specimen even in measurement operations because a specimen photographing position is set with an offset by performing autofocus for the cover glass 102B for each measurement point while a reference position is fixed even if the objective lens focus position changes with a change in ambient temperature.

Figure 7:
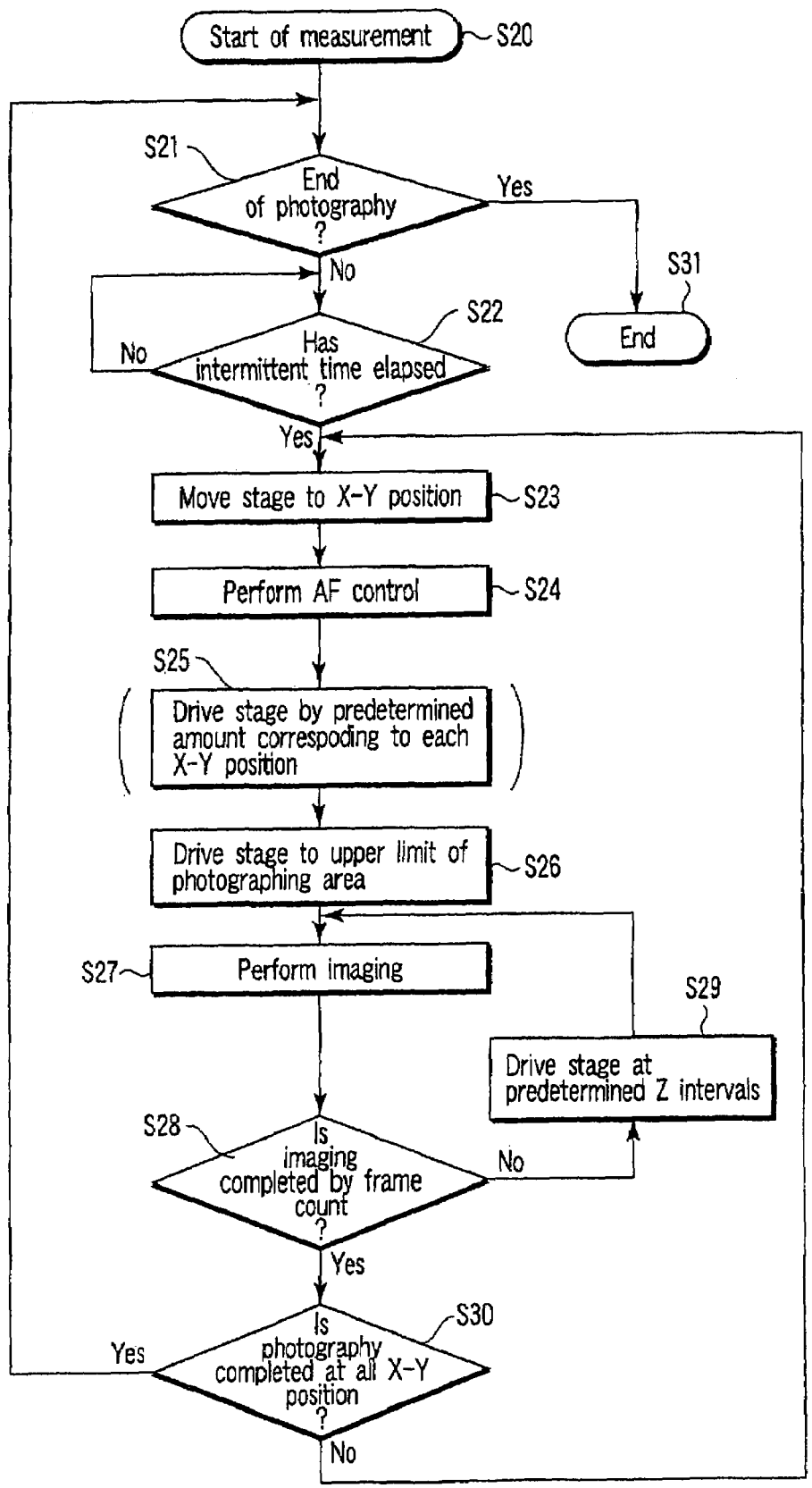
FIG. 7 is a flowchart showing the operation of the microscope system according to the second embodiment of the present invention.

In addition, at measurement points in the X-Y direction, if autofocus conditions acquired in previous time lapse measurement, e.g., a region for determining a specimen search range, are updated during AF control indicated by S24 in FIG. 7, AF control can be performed at a higher speed and with high reliability.

In this embodiment, an objective lens 109 need not be interchangeable. That is, the microscope need not have the function of a revolver capable of rotatably holding objective lenses and selectively placing one of them on an optical path.

Third Embodiment

This embodiment is directed to time lapse measurement including the exchange of objective lenses. Since the arrangement of a microscope system of this embodiment is the same as that of the first embodiment, a description thereof will be omitted.

If the conditions for time lapse measurement include the exchange of objective lenses, since different imaging lenses are to be used, the offset amount may need to be changed. In this embodiment, time lapse measurement is performed upon setting an offset amount for each objective lens.

An offset amount for each objective lens is set by operating an offset amount setting button for each objective lens, which is not shown in a host PC window, as in the first or second embodiment.

Figure 8:
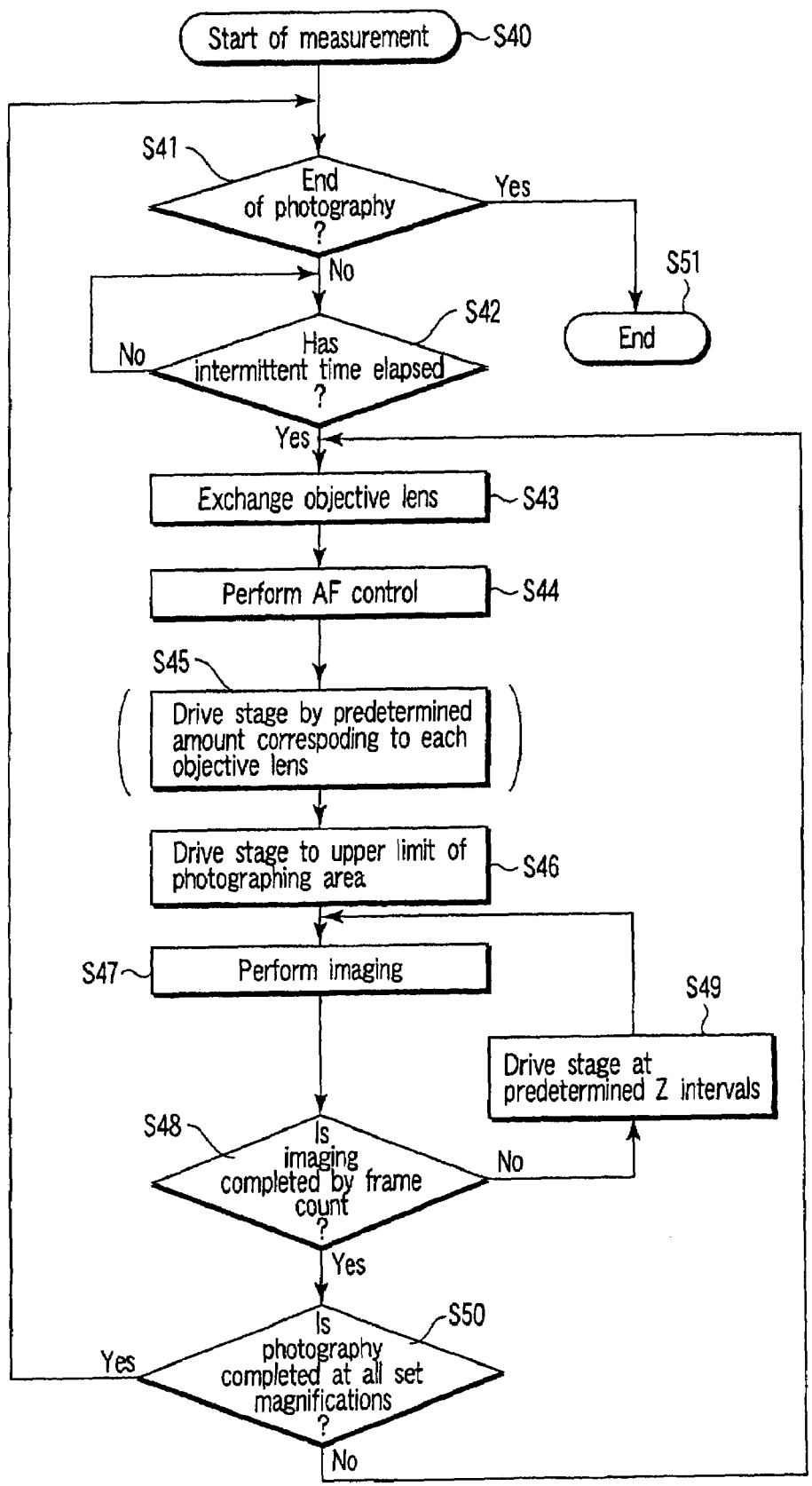
FIG. 8 is a flowchart showing operation control in a microscope system according to the third embodiment of the present invention.

FIG. 8 shows operation control on the microscope system in which an offset amount is set for each objective lens.

When measurement is started (S40), it is checked whether photography is completed by a predetermined frame count, and time lapse measurement corresponding to the photographing time (total) set by the host PC is finished (S41). If the measurement is finished, the processing is terminated (S51). If the measurement is not finished, the system is set in the standby state until the time lapse measurement interval set by the time lapse interval set by the host PC is reached (S42).

When the measurement interval is reached, the set objective lens is inserted on an optical path (S43). When the objective lens is inserted on the optical path, AF control is performed for the cover glass 102B to control the position of the cover glass 102B to the reference position (S44). After the cover glass 102B is positioned at the reference position, the stage 101 is driven by the offset amount set for each objective lens by the host PC (S45).

That is, after an autofocus unit 118 performs autofocus for the cover glass 102B, a stage Z control unit 116 moves the stage 101 by a predetermined constant amount, i.e., an offset amount.

The stage is further driven to the upper limit of the photographing area to acquire a Z-direction image (S46), and photography is performed (S47).

After the photographing is performed, photography is performed by the photographing count set by the host PC while the stage is driven by the photographing Z interval set by the host PC (S48, S49). This operation is repeated until photography is complete with all set objective lenses and the time lapse measurement finish conditions are satisfied (S50, S51).

The microscope system of this embodiment which has the above arrangement and is controlled in the above manner can reliably measure the movement of a specimen even in measurement operations by performing autofocus using an objective lens on each optical path when time lapse measurement conditions includes observation with objective lenses, even if a focus shift including the autofocus side exists between the objective lenses, because a specimen photographing position is set with an offset while a reference position is fixed.

In this embodiment, the stage 101 need not be capable of moving in the X-Y direction. That is, the stage 101 may be capable of moving in only the Z direction, and a stage X-Y control unit 115 may be omitted.

Fourth Embodiment

This embodiment is directed to time lapse measurement including excitation light conversion. Since the arrangement of a microscope system of this embodiment is the same as that of the first embodiment, a description thereof will be omitted.

If the conditions for time lapse measurement include fluorescence cube conversion, i.e., excitation light conversion, since a specimen has different luminescent portions, the offset amount may need to be changed. In this embodiment, time lapse measurement is performed after an offset amount is set for each excitation light conversion.

Figure 9:
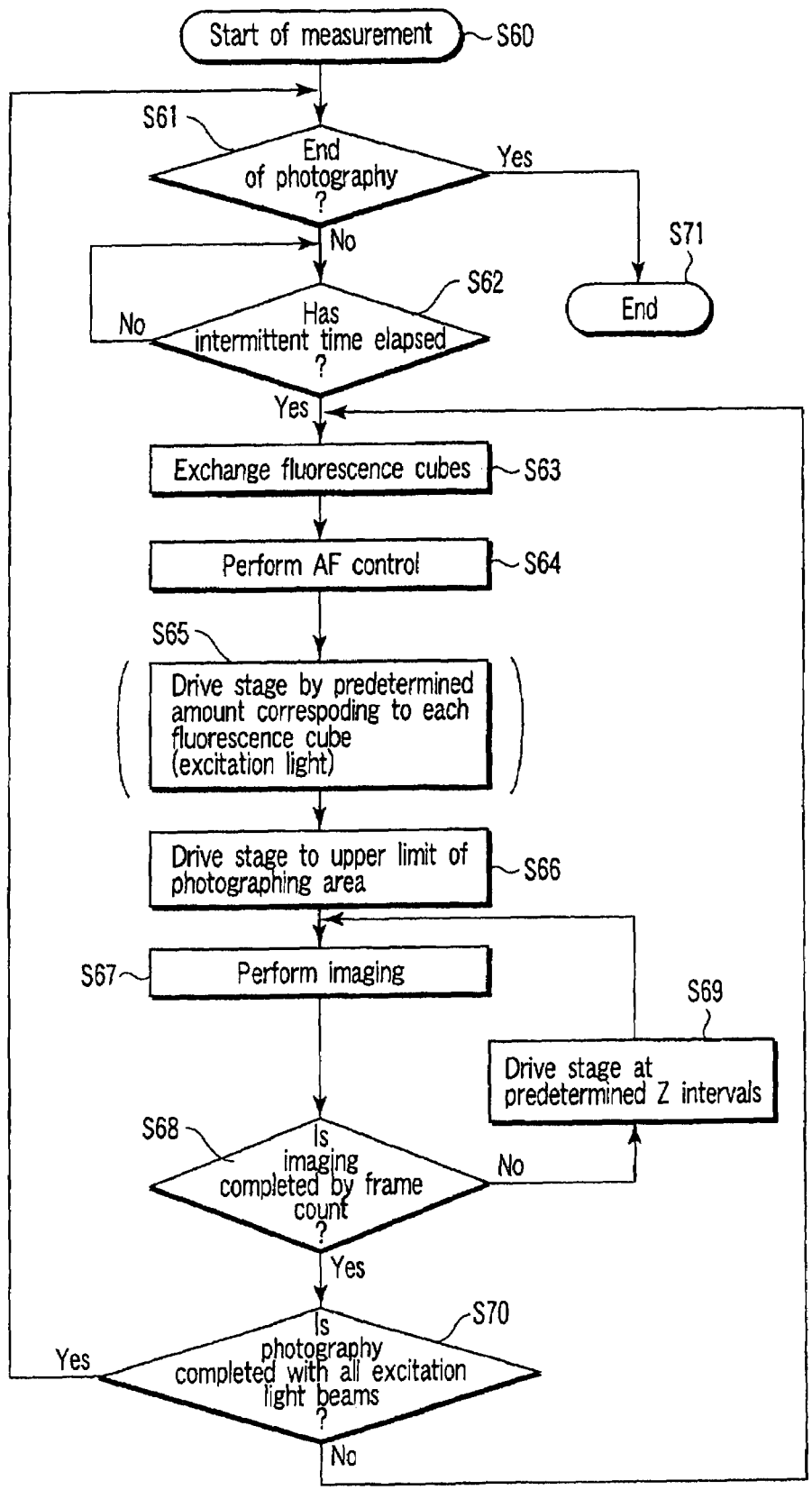
FIG. 9 is a flowchart showing operation control in a microscope system according to the fourth embodiment of the present invention.

FIG. 9 shows operation control on the microscope system in which an offset amount is set for each excitation light conversion.

When measurement is started (S60), it is checked whether photography is completed by a predetermined frame count, and time lapse measurement corresponding to the photographing time (total) set by the host PC is finished (S61). If the measurement is finished, the processing is terminated (S71). If the measurement is not finished, the system is set in the standby state until the time lapse measurement interval set by the time lapse interval set by the host PC is reached (S62).

When the measurement interval is reached, the fluorescence cube is inserted on an optical path (S63). When the fluorescence cube is inserted on the optical path and the excitation light is switched to another kind of excitation light, AF control is performed for the cover glass 102B to control the position of the cover glass 102B to the reference position (S64). After the cover glass 102B is positioned at the reference position, the stage 101 is driven by the offset amount set for each excitation light by the host PC (S65).

That is, after an autofocus unit 118 performs autofocus for a cover glass 102B, a stage Z control unit 116 moves a stage 101 by a predetermined constant amount, i.e., an offset amount.

The stage is further driven to the upper limit of the photographing area to acquire a Z-direction image (S66), and photography is performed (S67).

After the photographing is performed, photography is performed by the frame count set by the host PC while the stage is driven by the photographing Z interval set by the host PC (S68, S69). This operation is repeated until photography is complete with all set kinds of excitation light and the time lapse measurement finish conditions are satisfied (S70, S71).

The microscope system of this embodiment which has the above arrangement and is controlled in the above manner can, when the movement of an object with different luminescent points of a specimen is to be observed under time lapse measurement conditions for fluorescence observation, reliably measure the movement of the specimen for each excitation light by performing autofocus for a slide glass 102A or the cover glass 102B because a specimen photographing position is set with an offset while a reference position is fixed.

In this embodiment, autofocus is performed for the slide glass 102A or cover glass 102B for each observation. However, the photographing time may be shortened by performing autofocus at intermittent time intervals.

Although offset setting for each X-Y position of the stage in the second embodiment, offset setting for each objective lens in the third embodiment, and offset setting for each excitation light in the fourth embodiment are so described as to be independently performed, any two of these setting operations or all the three setting operations may be combined. In this case, measurement can be done with higher precision.

Fifth Embodiment

This embodiment is directed to AF control on a slide glass 102A or cover glass 102B. Since the arrangement of a microscope system of this embodiment is the same as that of the first embodiment, a description thereof will be omitted.

FIG. 10 shows a model of the slide glass 102A used in this embodiment. As shown in FIG. 10, the slide glass 102A has an AF marking 102C. The AF marking 102C is positioned in a range where it has no influence on an observation object 102D, and has been subjected to a process for improving the precision of autofocus control. This embodiment will exemplify an active AF. The AF marking 102C has been coated with a film which reflects laser light used for active AF at high reflectance.

Figure 11:
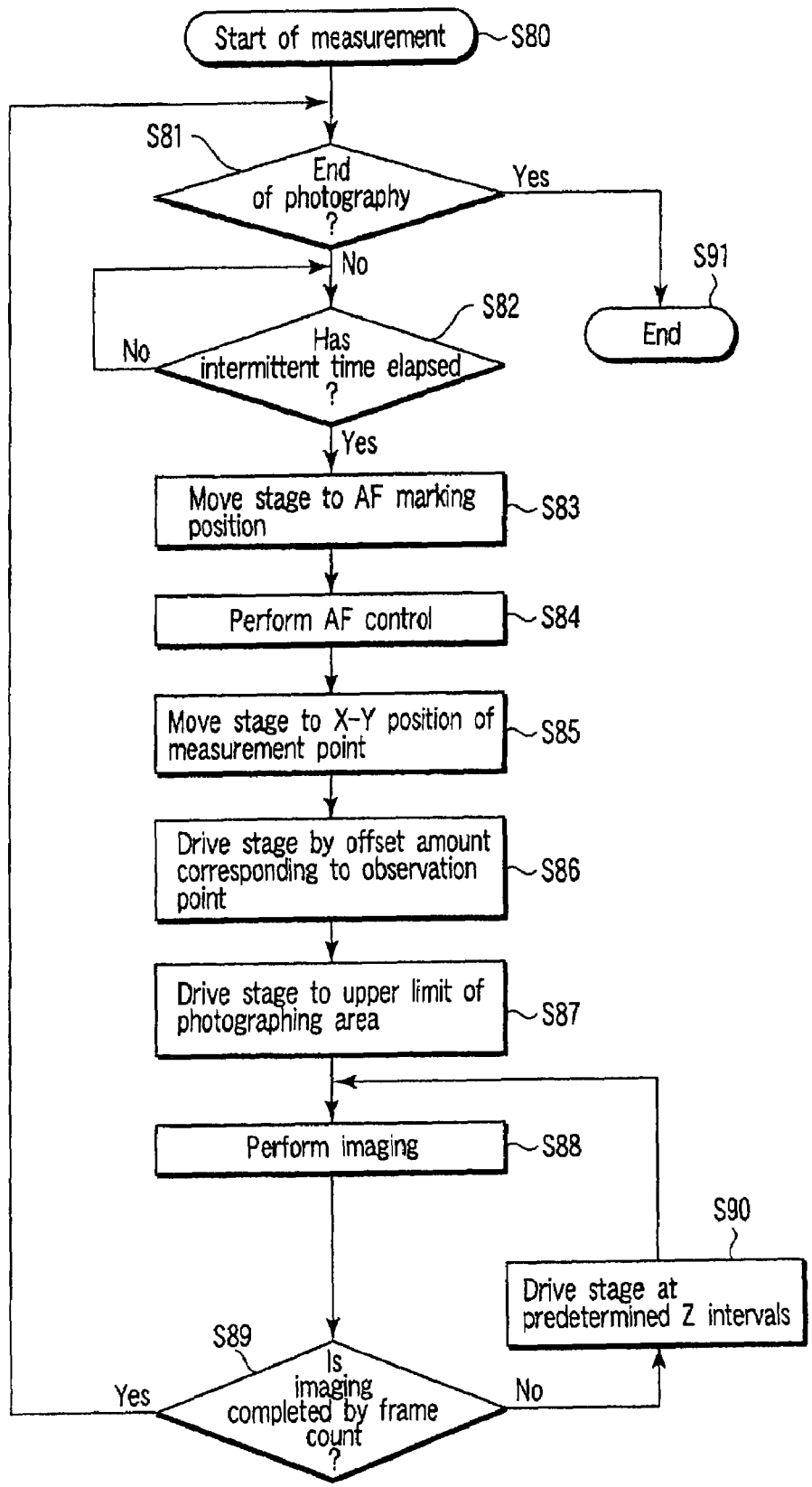
FIG. 11 is a flowchart showing operation control in the microscope system according to the fifth embodiment of the present invention.

FIG. 11 explains operation control in the above microscope system.

When measurement is started (S80), it is checked whether photography is completed by a predetermined frame count, and time lapse measurement corresponding to the photographing time (total) set by the host PC is finished (S81). If the measurement is finished, the processing is terminated (S91). If the measurement is not finished, the system is set in the standby state until the time lapse measurement interval set by the time lapse interval set by the host PC is reached (S82).

When the measurement interval is reached, the stage is driven to the AF marking position in the X-Y direction (S83). When the stage is moved to the AF marking position, autofocus control is performed to control the position of the cover glass 102B to the reference position (S84). After the cover glass 102B is positioned at the reference position, the stage is moved to an X-Y position where actual measurement is to be performed (S85). Then, the stage 101 is driven by the offset amount set in advance by the host PC (S86).

That is, an autofocus unit 118 performs autofocus for the AF marking 102C of the slide glass 102A, a stage Z control unit 116 moves the stage 101 by a predetermined constant amount, i.e., an offset amount.

In order to acquire a Z-direction image, the stage 101 is driven to the upper limit of the photographing area (S87), and photography is performed (S88).

After the photographing is performed, photography is performed by the frame count set by the host PC while the stage is driven by the photographing Z interval set by the host PC (S89, S90). This operation is repeated until photography is complete with all set kinds of excitation light and the time lapse measurement finish conditions are satisfied (S89, S91).

In the microscope system of this embodiment, since high-precision AF can be performed for the slide glass 102A, the measurement precision can be improved. In addition, since an autofocus target is known, optimal autofocus conditions can be set. This makes it possible to shorten the focusing time and improve the throughput of measurement.

This embodiment has exemplified the case wherein autofocus is performed by the active AF scheme, and a reflecting film is used as the AF marking 102C accordingly. However, autofocus may be performed by a passive AF scheme. In this case, a high-contrast marking is used as the AF marking 102C, and autofocus control such as a known hill-climbing scheme may be performed.

Sixth Embodiment

Figure 12:
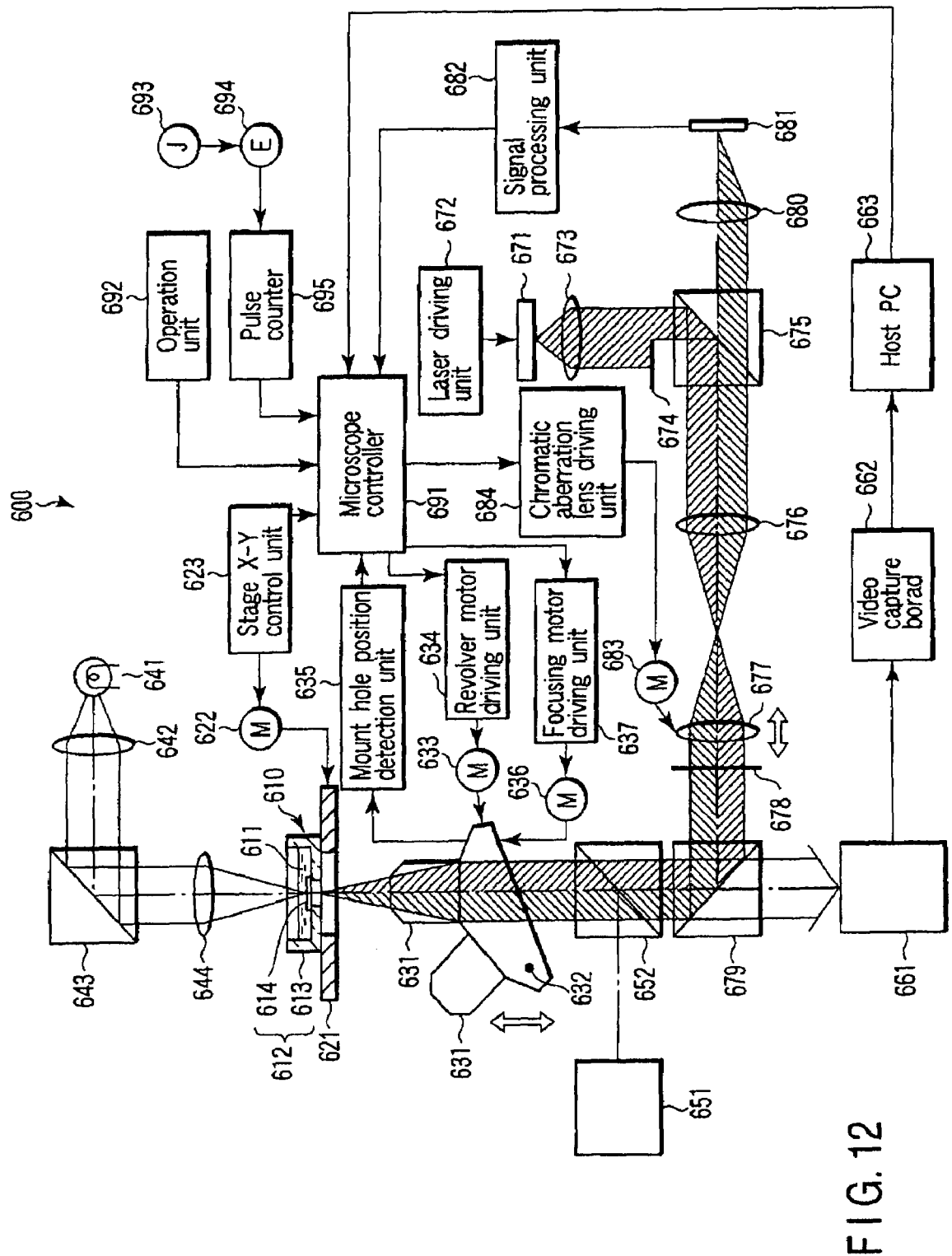
FIG. 12 is a view showing the arrangement of a microscope system according to the sixth embodiment of the present invention.

This embodiment is directed to a microscope system including an inverted microscope. FIG. 12 shows the arrangement of the microscope system according to the sixth embodiment of the present invention.

As shown in FIG. 12, a microscope system 600 according to this embodiment comprises a stage 621 on which an observation sample 610 is to be placed, and an observation optical system including an objective lens 631 which is placed to face the observation sample 610 placed on the stage 621.

The observation sample 610 comprises an observation object 611 and a vessel 612 (so-called dish) which houses the observation object 611. The observation object 611 comprises, for example, a specimen (e.g., a cell) and a culture solution. The vessel 612 comprises a dish-like transparent vessel body 613 having an opening in its bottom portion and a cover glass 614 sealing the opening of the vessel body 613. Therefore, the observation object 611 is positioned above the cover glass 614, and the objective lens 631 is positioned below the cover glass 614.

The stage 621 is capable of moving in the X-Y direction. In order to motor-drive and control the position of the stage 621 in the X-Y direction, the microscope system 600 comprises a stage driving motor 622 for moving the stage 621 in the X-Y direction and a stage X-Y control unit 623 which controls the position of the stage 621 in the X-Y direction.

The objective lens 631 is mounted on a motorized revolver. The motorized revolver comprises a revolver body 632 which can hold objective lenses 631, a revolver motor 633 for rotating the revolver body 632, and a revolver motor driving unit 634 for controlling the revolver motor 633.

The motorized revolver can selectively place one of the objective lenses 631 held on the revolver body 632 on an optical path by controlling the rotation of the revolver body 632 using the revolver motor driving unit 634.

The revolver body 632 has objective lens mount holes in which the objective lenses 631 can be mounted. The motorized revolver further includes a mount hole position detection unit 635 for detecting the objective lens mount hole of the revolver body 632 in which the objective lens 631 placed on the optical path is mounted.

The revolver body 632 can move along the observation optical axis. The microscope system 600 further comprises a focusing driving motor 636 which moves the revolver body 632 along the observation optical axis for focusing operation and a focusing motor driving unit 637 which controls the focusing driving motor 636. The focusing driving motor 636 and focusing motor driving unit 637 constitute a focusing unit which moves at least the stage or the objective lens for focusing operation.

The microscope system 600 comprises an active AF device based on an active pupil division method. The AF device comprises a reference light source 671, laser driving unit 672, collimator lens 673, light-emitting side stopper 674, polarizing beam splitter (PBS) 675, condenser lens group 676, chromatic aberration correction lens group 677, $\lambda/4$ plate 678, dichroic mirror 679, light-receiving sensor 681, signal processing unit 682, chromatic aberration lens group driving motor 683, and chromatic aberration lens driving unit 684.

The microscope system 600 comprises a microscope controller 691 which controls the stage X-Y control unit 623, revolver motor driving unit 634, focusing motor driving unit 637, and chromatic aberration lens driving unit 684. The microscope controller 691 is a known CPU circuit. An operation unit 692 including various kinds of operation SWs is connected to the microscope controller 691. An observer can perform operations such as starting/stopping AF or switching objective lenses, or can input necessary information associated with AF, e.g., a glass thickness, through the operation unit 692. A jog dial 693 is connected to the microscope controller 691 through a pulse counter 695 and jog encoder 694. The observer can move the revolver body 632 vertically through the jog dial 693.

The microscope system 600 comprises a transmitted illumination optical system which provides transmitted illumination for the observation sample 610. The transmitted illumination optical system includes an illumination light source 641, lens 642, mirror 643, and lens 644.

The microscope system 600 also comprises an illumination optical system for fluorescence observation. The fluorescence illumination optical system includes a light source 651 which emits excitation light and a fluorescence cube 652. The fluorescence cube 652 can be exchanged with another one by motor-driven control. The illumination optical system for fluorescence observation can selectively apply excitation light beams having different wavelengths. In other words, the illumination optical system for fluorescence observation can select excitation light.

The microscope system 600 need not comprise both a transmitted illumination optical system and an illumination optical system for fluorescence observation, and may comprise one of the illumination optical systems in accordance with an observation purpose.

The microscope system 600 further comprises a TV camera 661 for sensing an observation image, a video capture board 662, and a host PC 663.

In transmitted illumination observation, illumination light from the illumination light source 641 passes through the lens 642 and is reflected by the mirror 643. The reflected light is condensed by the lens 644 and illuminates the observation sample 610 from above. The light transmitted through the observation sample 610 passes through the objective lens 631 and is transmitted through the dichroic mirror 679 to strike the TV camera 661.

In fluorescence observation, the excitation light emitted from the light source 651 is reflected by the fluorescence cube 652, passes through the objective lens 631, and strikes the observation sample 610. The fluorescence emitted from the observation sample 610 passes through the objective lens 631 and is wavelength-selected by the fluorescence cube 652. The resultant light passes through the dichroic mirror 679 and strikes the TV camera 661.

The images sensed by the TV camera 661 are acquired by the host PC 663 through the video capture board 662 as in the first embodiment. The host PC 663 can store the acquired images in an image memory (not shown).

In the microscope system 600, the AF device based on the active pupil division method applies a laser beam to the observation sample, and detects the reflected light, thereby adjusting the focus.

The reference light source 671 comprises a light source which emits light in an invisible wavelength range, i.e., an infrared laser. The reference light source 671 is controlled by the laser driving unit 672. The laser driving unit 672 controls the intensity of the reference light source 671 by performing pulse lighting of the reference light source 671.

The laser beam emitted from the reference light source 671 passes through the collimator lens 673 to become a parallel light beam. Half of the light beam diameter is cut by the light-emitting side stopper 674, and only a P-polarized light component is reflected by the polarizing beam splitter (PBS) 675.

The light beam from the polarizing beam splitter (PBS) 675 is converged once by the condenser lens group 676 and then passes through the chromatic aberration correction lens group 677. The light passing through the chromatic aberration correction lens group 677 is polarized by 45° when it passes through the λ/4 plate 678 and strikes the dichroic mirror 679. The dichroic mirror 679 reflects only light in the infrared region, and hence the laser light beam is reflected. The reflected light beam passes through the objective lens 631 and strikes the observation sample 610 to form a light spot.

The light beam reflected by the observation sample 610 strikes the objective lens 631 and is reflected by the dichroic mirror 679. The reflected light beam is polarized by 45° to be converted into an S-polarized light component when it passes through the λ/4 plate 678 again. The light beam further passes through the chromatic aberration correction lens group 677 and condenser lens group 676 and strikes the PBS 675. The light beam is transmitted through the PBS 675 because the light beam has become an S-polarized light component. The transmitted light beam passes through a condenser lens group 680 and is then formed into an image on the light-receiving sensor 681.

The light-receiving sensor 681 is a two-segments photodiode having two adjacent light-receiving portions, and is placed such that an optical axis is located on a boundary line between the two light-receiving portions. The signal processing unit 682 acquires a so-called S-shaped curve which allows determination of a focus position and focusing direction. The microscope controller 691 performs autofocus control on the observation optical system by controlling the focusing motor driving unit 637 on the basis of the information (S-shaped curve) obtained by the signal processing unit 682.

This AF device can perform chromatic aberration correction for the infrared laser by moving the chromatic aberration correction lens group 677 along the optical axis by using the chromatic aberration lens group driving motor 683, and can perform so-called optical offset driving of shifting the focus position. This can compensate for the focus drift difference between the observation optical system and the AF optical system which is caused by, for example, a temperature change. In other words, this makes it possible to equalize the focus drifts of the two systems.

In the microscope system 600 of this embodiment, as in the first embodiment, after autofocus is performed for the cover glass 614 by active AF, the revolver body 632 is moved by the focusing motor driving unit 637 to move the objective lens 631 by a predetermined constant amount, i.e., an offset amount. This makes it possible to obtain the same advantages as those of the first embodiment.

As in the same manner that the second to fifth embodiments are applied to the first embodiment, the second to fifth embodiments may be applied to the microscope system 600 of the sixth embodiment. In such cases, the same advantages as those of the second to fifth embodiments can be obtained.

<Microscope Focus Maintaining Device>

An embodiment of a microscope focus maintaining device which can be applied to the above microscope system will be described next. Although a microscope focus maintaining device applied to an inverted microscope will be representatively described below, the microscope focus maintaining device to be described below may be applied to an upright microscope.

Seventh Embodiment

Figure 13:
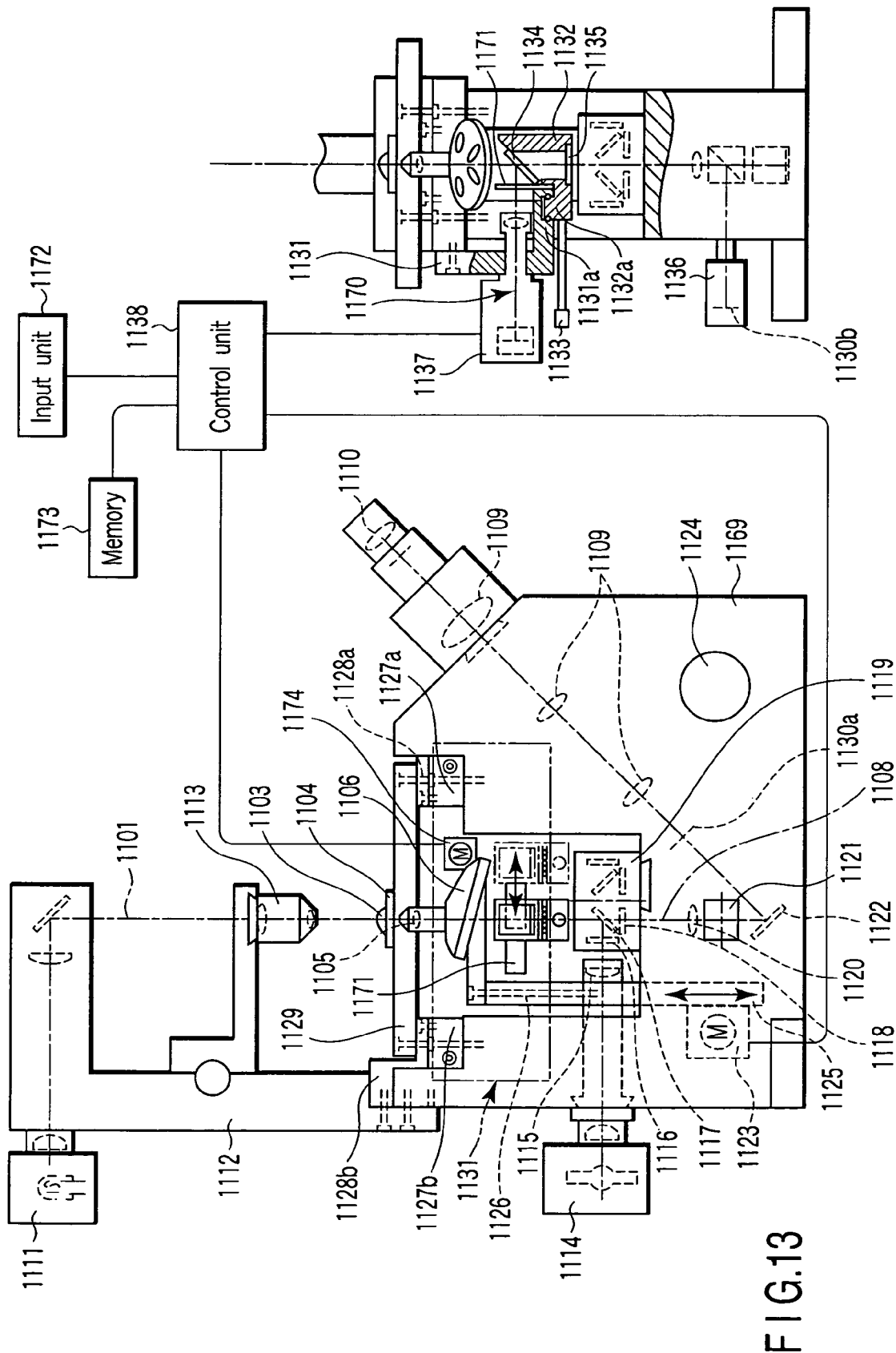
FIG. 13 is a view showing the overall arrangement of a microscope according to the seventh embodiment of the present invention.
Figure 14:
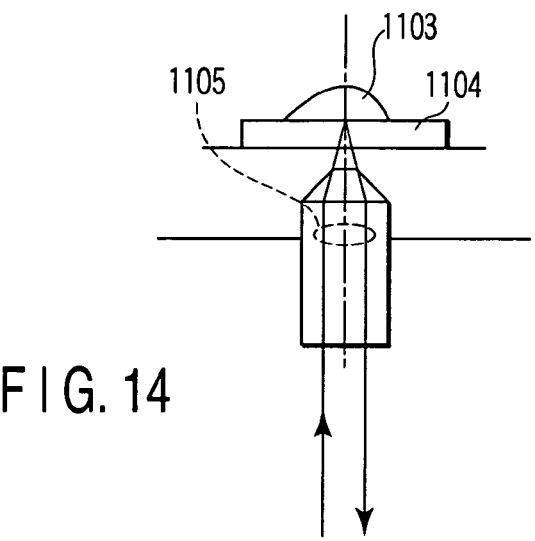
FIG. 14 is a view showing portions around an observation sample in FIG. 13.
Figure 15A:
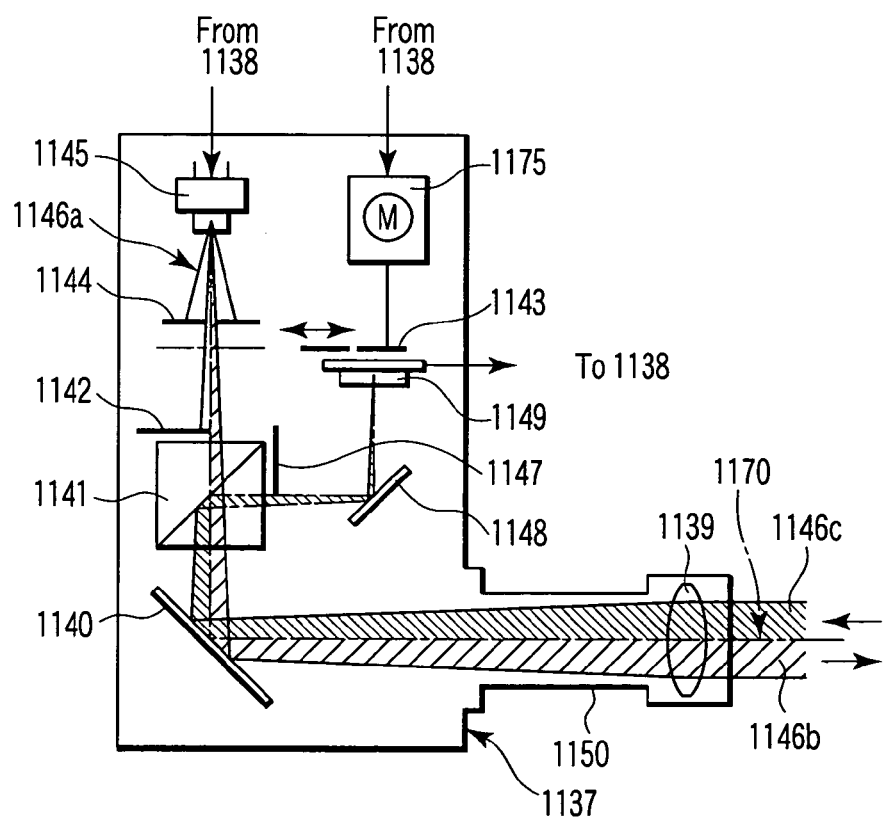
FIG. 15A is a plan view of a sensor head shown on the right side of FIG. 13.
Figure 15B:
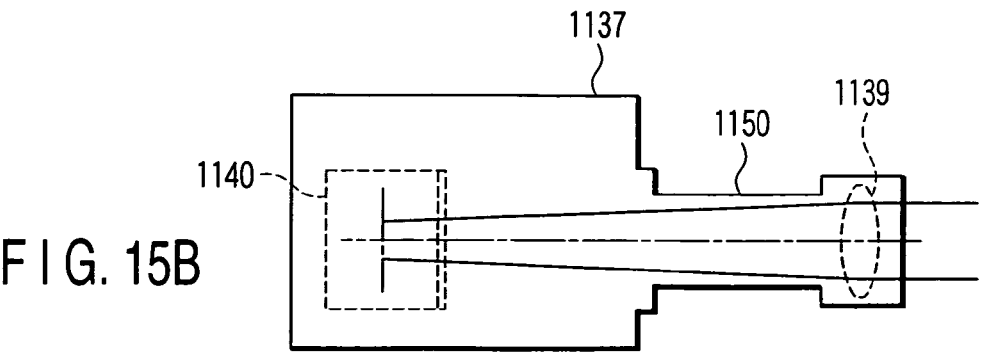
FIG. 15B is a front view of the sensor head shown in FIG. 15A.

The seventh embodiment of the present invention will be described with reference to FIGS. 13, 14, 15A, and 15B. This embodiment is directed to a microscope comprising a microscope focus maintaining device. FIG. 13 shows the overall arrangement of the microscope according to the seventh embodiment of the present invention. FIG. 13 shows a side surface of the microscope on the left side, together with portions around the objective lens of the microscope on the right side. FIG. 14 shows portions around an observation sample in FIG. 13. FIG. 15A is a plan view of a sensor head shown on the right side in FIG. 13. FIG. 15B is a front view of the sensor head shown in FIG. 15A.

The arrangement and function of the microscope will be described first.

The microscope includes an X-Y stage 1129 on which an observation sample is to be placed. The observation sample includes a cover glass 1104 as a transparent member and an observation object 1103 which is held on the cover glass. The observation object 1103 includes a cell as a specimen and a culture solution which cultures the cell. The microscope further includes an objective lens 1105 placed below the X-Y stage 1129, a CCD 1136 for the observation of the observation object 1103 through the objective lens 1105, and an optical path switching prism 1121 which optically couples the CCD 1136 to the objective lens 1105. The microscope further includes an eyepiece lens 1110 for the observation of the observation object through the eyes, a mirror 1122 which optically couples the eyepiece lens 1110 to the objective lens 1105, and a relay lens 1109 placed between the mirror 1122 and the eyepiece lens 1110. In addition, the microscope includes a transmitted illumination optical system including a light source 1111 and condenser lens 1113, and an epi-fluorescence illumination system including a mercury lamp 1114, an epi-fluorescence emitting tube 1115, and a fluorescence filter cassette 1119.

Illumination light from the light source 1111 illuminates the observation object 1103 and cover glass 1104 through transmitted illumination optical elements provided in a transmitted illumination pillar 1112 and the condenser lens 1113.

Of illumination light from the mercury lamp 1114 for epi-fluorescence illumination, only light having a wavelength which can efficiently excite a fluorescent dye staining the cell in the observation object 1103 is transmitted through an excitation filter 1116 provided in the fluorescence filter cassette 1119 through the epi-fluorescence emitting tube 1115 to become excitation light. This light is coaxially guided along an observation optical axis 1108 through a dichroic mirror 1117 and is reflected toward the objective lens 1105 to excite the fluorescent dye staining the observation object 1103 through the objective lens 1105. In this case, four types of each of fluorescence filters, including the excitation filter 1116, the dichroic mirror 1117, and an absorption filter 1118, are mounted in the fluorescence filter cassette 1119. These filters can be inserted/withdrawn on/from the optical path and switched in accordance with the fluorescent dye to be used by a known switching mechanism such as a turret system.

The observation object 1103 placed on the cover glass 1104 is placed on the X-Y stage 1129 and can be moved to a desired observation position of the observation object 1103 by operating an X-Y handle (not shown). The objective lens 1105 which projects an image of the observation object 1103 at infinity is screwed into the revolver 1106 below the observation object 1103. Although only one objective lens 1105 is mounted in the revolver in FIG. 13, five objective lenses can be mounted in the revolver. When a button or the like provided on an input unit 1172 is pressed, the outer surface of the revolver is rotated by a motor 1174 under the control of a control unit 1138, thereby switching to a desired objective lens. Although not shown, the rotational position of a revolver 1106 is detected by a sensor to allow the control unit 1138 to recognize an objective lens on the optical path. The revolver 1106 is held on a vertical guide 1125 through a revolver raising member 1126 and is vertically moved by a motor 1123 so as to focus the observation object 1103. That is, the revolver 1106, revolver raising member 1126, vertical guide 1125, and motor 1123 constitute a focusing driving unit. Although the motor 1123 is controlled by the control unit 1138, the revolver can be vertically moved by rotating a focusing handle 1124.

Parallel light which exists from the objective lens 1105 and is projected at infinity is formed into an image on objective lens primary image planes 1130*a* and 1130*b* by an imaging lens 1120. In the case of fluorescence observation, the fluorescence emitted from the observation object 1103 exits from the objective lens 1105 and is transmitted through the dichroic mirror 1117. Of this light, light having a wavelength necessary for observation is selectively transmitted through the absorption filter 1118, guided to the imaging lens 1120, and formed into an image on the objective lens primary image planes 1130*a* and 1130*b*.

The optical path switching prism 1121 is detachably held on the observation optical axis 1108. In observation with the CCD 1136, the optical path switching prism 1121 is inserted on the observation optical axis 1108, an objective lens primary image 1130*b* is reflected by the optical path switching prism 1121 and can be observed through the CCD 1136. In observation with the eyes, the optical path switching prism 1121 is removed from the observation optical axis 1108, and an objective lens primary image plane 1133*a* is reflected by the optical path switching prism 1121 toward the eyepiece lens 1110. The objective lens primary image plane is relayed by the relay lens 1109 to be observed through the eyepiece lens 1110.

Transmitted illumination observation is the same as fluorescence observation except that observation is performed upon withdrawal of a fluorescence filter from the optical path.

The arrangement and function of the microscope focus maintaining device will be described next.

The microscope focus maintaining device roughly comprises a sensor head 1137 which performs focus detection with a laser light beam, and a microscope-side optical path switching unit which optically couples the sensor head 1137 to the objective lens 1105. The microscope-side optical path switching unit will be described first.

The optical path switching unit includes a dichroic mirror 1134 and a movable guide 1132 which movably holds the dichroic mirror 1134 on a fixed guide 1131.

The dichroic mirror 1134 has the property of reflecting only 800-nm laser light from the sensor head 1137 and transmitting all visible light necessary for observation. The dichroic mirror 1134 coaxially guides a laser light beam from a sensor head optical axis 1170 of the sensor head 1137 to the observation optical axis 1108 and reflects it toward the objective lens 1105. The dichroic mirror 1134 is fixed to the movable guide 1132 with adhesive, screws, or the like. An IR cut filter is bonded and fixed to the movable guide 1132 at a position below the dichroic mirror 1134. In order to prevent laser light from entering the eyes, this IR cut filter cuts 800-nm laser beam and transmits only visible light necessary for observation.

The movable guide 1132 is designed to be capable of moving in the direction indicated by the arrow shown on the left side of FIG. 13 (in the back-and-forth direction relative to the observer) with respect to a guide portion 1131*a* of the fixed guide 1131 through a guide portion 1132*a*. By operating an operation lever 1133 back and forth, the dichroic mirror 1134 and an IR cut filter 1135 can be inserted/withdrawn on/from the observation optical axis 1108. A light-shielding plate 1171 is fixed to the movable guide 1132. When the dichroic mirror 1134 is withdrawn from the optical path as indicated by the left portion of FIG. 13, the light-shielding plate 1171 is inserted onto the sensor head optical axis 1170 to prevent a laser light beam from exiting to the right side of a microscope body 1169. There is therefore no possibility of causing any harmful laser light to strike the observer.

Note that the fixed guide 1131 is held on the microscope body 1169 while being fixed to a lower front side stage raising member 1127*a* and lower back side stage raising member 1127*b* with screws, and holds and fixes the sensor head 1137 through a fitting portion 1150 of the sensor head 1137.

The switching mechanism for the dichroic mirror 1134 and the mount of the sensor head 1137 are arranged between the revolver 1106 and the fluorescence filter cassette 1119 in this manner. In order to ensure a space for this arrangement, the revolver 1106 is raised by the revolver raising member 1126 as described above, and the X-Y stage 1129 and transmitted illumination pillar are also raised. The X-Y stage 1129 is raised by the lower side stage raising members 1127*a* and 1127*b* fixed to the microscope body 1169 with screws and by upper side stage raising members 1128*a* and 1128*b* fixed to the lower side stage raising members 1127*a* and 1127b with screws. The X-Y stage 1129 is fixed to the upper side stage raising members 1128a and 1128b with screws.

In this case, the raising members constitute two units for the following reason. If the above raising operation is to be performed by using the screws with which the X-Y stage 1129 is fixed to the microscope body 1169, the raising members must be fastened together with the X-Y stage 1129. As a consequence, just unfastening the X-Y stage 1129 will unfasten the raising members and also unfasten the fixed guide 1131 and sensor head 1137 fixed to the raising members. This makes it impossible to stably maintain the focus because the optical center of the sensor head 1137 deviates from that of the microscope body 1169.

The sensor head 1137 will be described next with reference to FIGS. 15A and 15B.

The sensor head 1137 includes a laser diode (LD) 1145, a beam diameter restriction stop 1144 which restricts the diameter of a laser light beam from the LD 1145, a pupil division stop 1142 which changes a circular beam from the beam diameter restriction stop 1144 into a semicircular beam, a mirror 1140 which deflects the laser light beam, and an imaging lens 1139 which collimates the laser light beam. The sensor head 1137 further includes a beam splitter 1141 which splits exit light from return light, a mirror 1148 which deflects the return light beam from the beam splitter 1141, and a photodiode (PD) 1149 which detects the return light. The sensor head 1137 further includes a high-NA objective lens dedicated beam restriction stop 1143 and a motor 1175 for properly placing the stop on an optical path.

An 800-nm laser light beam 1146a emitted from the laser diode 1145 is restricted to a necessary beam angle by a beam diameter restriction stop 1144 having a circular opening in its center, and the circular beam is restricted to a semicircular beam by a pupil division stop 1142. This laser light beam is transmitted through the beam splitter 1141, reflected by the mirror 1140, and collimated by the imaging lens 1139. Referring to FIG. 15A, reference numeral 1146b denotes a light beam on the laser projection side. In this case, the beam diameter restriction stop 1144 prevents a focus detection error due to flare or the like by restricting unnecessary light beams of the laser light beams exiting from the LD 1145.

The collimated laser light beam exiting from the sensor head 1137 is reflected by the dichroic mirror 1134 and condensed by the objective lens 1105. This laser light beam is then reflected by the boundary surface between the cover glass 1104 and the observation object 1103, and returns to the sensor head 1137 through the objective lens 1105 and dichroic mirror 1134. Referring to FIG. 15A, reference numeral 1146c denotes a laser light beam which is reflected by the observation sample and has returned therefrom, and indicates an optical path on the detection side.

The laser light which has returned to the sensor head 1137 is reflected by the mirror 1140, beam splitter 1141, and mirror 1148, and is condensed and strikes the photodiode 1149 serving as a light-receiving element having a photoelectric conversion function. In this case, a pupil division stop 1147 is placed on the detection-side optical path to cut any laser light beam harmful to focus detection, e.g., flare produced midway along the optical path.

As is obvious from the above description, in the microscope focus maintaining device of this embodiment, laser light used for focus detection is guided from a side closer to the objective lens 1105 than the epi-fluorescence illumination system. More specifically, the laser light used for focus detection is guided to the objective lens 1105 by the dichroic mirror 1134 placed between the objective lens 1105 and the fluorescence filter cassette 1119.

When the conventional focus maintaining device based on the Through-the-Lens: TTL system is applied to a fluorescence microscope, light used for focus detection is guided from a side closer to the image than the fluorescence illumination device. For this reason, the focus detection optical path passes through the fluorescence filter cassette. In general, invisible light which is not generally used for observation is used as light used for focus detection so as not to become stray light to observation light. The fluorescence filter cassette generally has the property of not transmitting light with wavelengths other than the wavelength required for fluorescence observation. For this reason, the fluorescence filter cassette may not transmit light used for focus detection. In such a case, focus detection cannot be done. The fluorescence filter cassette may be withdrawn from the optical path at the time of focus detection. This, however, causes a loss of time, resulting in a decrease in throughput in a case wherein information about many places in an observation object is to be obtained or time lapse images are to be obtained at short time intervals, in particular.

In this embodiment, laser light used for focus detection is guided from a side closer to the objective lens 1105 than the epi-fluorescence illumination system, and hence is not transmitted through the fluorescence filter cassette. Therefore, there is only a small loss of focus detection light which strikes the light-receiving element for focus detection. This makes it possible to stably maintain the focus.

In addition, the wavelength of laser light used for focus detection is different from that of light used for fluorescence observation. For this reason, there is no possibility that light for focus detection enters as stray light fluorescence observation light. This allows fluorescence observation with high contrast. Furthermore, since laser light is guided by the dichroic mirror 1134, the losses of light used for focus detection and light used for fluorescence observation can be minimized. This makes it possible to obtain a bright observation image.

In addition, in this embodiment, light used for focus detection is guided from between the infinite objective lens 1105 and the imaging lens 1120. More specifically, laser light used for focus detection is guided to the objective lens 1105 by the dichroic mirror 1134 placed between the objective lens 1105 and the imaging lens 1120.

When a focus detection optical path is to be guided from a side closer to the image than the imaging lens in the inverted microscope, accurate focus detection cannot be performed in the optical path contrast detection scheme unless a telecentric optical system in which a chief ray is perpendicular to an image plane is formed. On the other hand, a primary image of the objective lens which is formed by the imaging lens is not a telecentric optical system. For this reason, the objective lens primary image must relayed to near the light-receiving element for focus detection so as to form a telecentric optical system. Although a new space is required to form a relay optical system, various devices such as an imaging device, a manipulator for operating a cell, and a laser stimulating device are arranged around the microscope body in the inverted microscope, and hence it is difficult to form a focus maintaining device in the limited space.

In a laser projection type focus detection scheme, a light-receiving element for focus detection may be placed on an objective lens primary image plane unlike in the optical path difference contrast detection scheme. However, the distance from the imaging lens to the image plane is limited to about 180 to 200 mm. Since much of this distance is in the inverted microscope body, it is difficult in consideration of the space to form a focus maintaining device outside the inverted microscope body. Although this problem can be solved by relaying an objective lens primary image, it is difficult to form a focus maintaining device within a limited space free from interference with various devices around the inverted microscope, as in the case of the optical path difference contrast detection scheme described above.

In this embodiment, light used for focus detection is guided from between the infinite objective lens and the imaging lens. In the optical path difference contrast detection scheme, therefore, there is no need to relay an objective lens primary image. In addition, in the case of the laser projection type focus detection scheme, only placing the imaging lens on the focus detection optical path in accordance with the position of the light-receiving element for focus detection can eliminate the necessity to relay an objective lens primary image. In addition, since the imaging lens can be arbitrarily positioned, the light-receiving element can be arbitrarily positioned, thus eliminating the possibility of interference with various devices around the inverted microscope body.

Furthermore, the wavelength of laser light used for focus detection is different from the wavelength of light used for observation. This eliminates the possibility that light for focus detection enters as stray light observation light, thus allowing observation with high contrast. Moreover, since laser light is guided by the dichroic mirror 1134, losses of light used for focus detection and light used for observation can be minimized. This makes it possible to obtain a bright observation image.

An outline of the focus detection method in this embodiment will be briefly described next.

Figure 27:
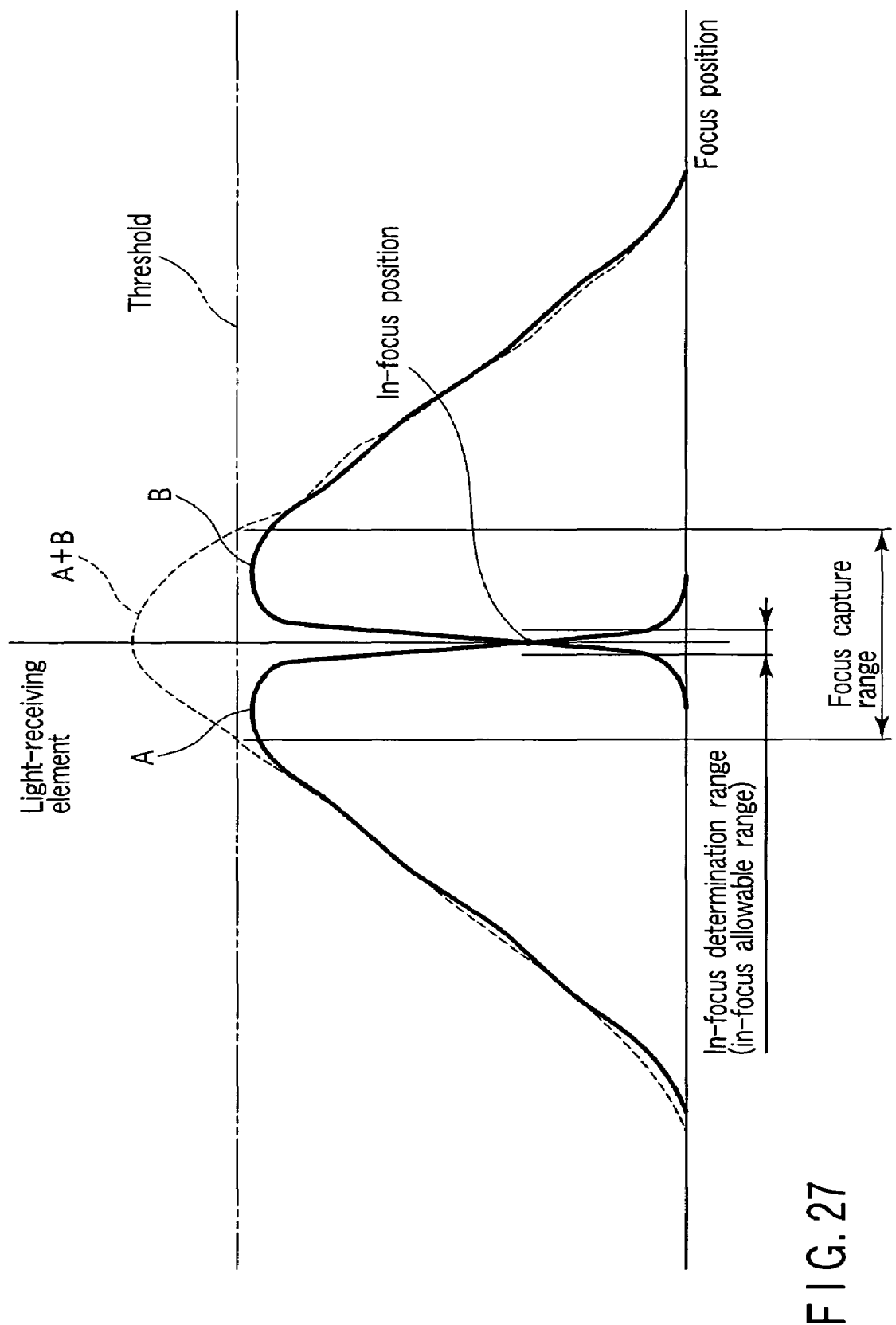
FIG. 27 is a graph in which the ordinate represents the outputs of the two-segments photodiode as the A and B phases; and the abscissa, the movement of the focus in the optical axis direction on the observation sample side.

The PD 1149 is a two-segments photodiode whose output is divided into two regions corresponding to the A and B phases with a pupil division plane, as a boundary, which is perpendicular to the direction of pupil division by the pupil division stops 1142 and 1127. The laser light beam which strikes the PD 1149 is photoelectrically converted by the PD 1149, and the output of the PD 1149 changes as shown in FIG. 27 together with variations in focus position. FIG. 27 is a graph in which the ordinate represents the outputs of the two-segments photodiode as the A and B phases; and the abscissa, the movement of the focus in the optical axis direction on the observation sample side. Referring to FIG. 27, "A+B" represents the value obtained by adding the output in the A phase and the output in the B phase.

The control unit 1138 performs various predetermined computations on outputs from the PD 1149. At the same time, the control unit 1138 finally performs focus detection by determining a focus position as an in-focus position at which the A-phase output coincides with the B-phase output in FIG. 27 by controlling the motor 1123 for focus driving.

More specifically, first of all, a proper threshold value is set in advance for each objective lens type or each observation object reflectance with respect to the value of "A+B". The control unit 1138 then monitors, while moving the focus, whether or not "A+B" exceeds this threshold. Only after "A+B" exceeds the threshold, computation for focus detection is performed. For example, computation is performed to check whether (A−B)/(A+B) becomes 0.

In this case, a focus range in which "A+B" exceeds the threshold will be referred to as a focus capture range. If the threshold becomes too low, the focus capture range widens, and hence the range in which computation for focus detection is performed widens. As a consequence, the computation time increases, and hence it takes much time for focus detection. In addition, since a focus signal (an output from the light-receiving element) with a low level in a greatly defocused state must be computed, this operation becomes relatively susceptible to noise components. As a consequence, operation errors tend to occur.

If the threshold is too high, the focus capture range narrows. If the focus capture range becomes too narrow, smaller feed steps must be set in the focus direction so as not to miss the focus capture range when it is monitored, while the focus is moved, whether or not "A+B" exceeds the threshold (this operation will be referred to as focus search herein after). This increases the total focus detection time. As described above, problems arise when the focus capture range is too narrow or wide, and hence a proper focus capture range must be set.

There are various parameters for focus detection, e.g., the magnification, NA, and WD of the objective lens 1105. Such parameters include, for example, "threshold value" corresponding to the total value of "A+B" of A-phase and B-phase outputs from the PD 1149 described with reference to FIG. 27, "focus capture range" determined from the threshold value, "focus feed step" for monitoring (focus search) whether or not "A+B" exceeds the threshold, "focus search range" for focus search, "in-focus allowable range" for final determination of an in-focus state, and "integral time" of the PD 1149 which changes in accordance with the power of laser light striking the PD 1149.

In this embodiment, the diameter of a laser light beam on the pupil plane of the objective lens 1105 (between the imaging lens 1139 and the objective lens 1105) is set to about 11 mm. With a 10× objective lens, the pupil diameter is about 14 mm. With a 100× objective lens, the pupil diameter is about 5 mm. With the 10× objective lens, since the diameter of a laser light beam is smaller than the pupil diameter, all the light beam strikes the objective lens without being vignetted by the frame of the objective lens. With the 100× objective lens, however, the diameter of a laser light beam is larger than the pupil diameter, the light beam is vignetted by the frame of the objective lens. That is, the power of laser light finally striking the PD 1149 varies depending on whether the 10× objective lens or 100× objective lens is used. Consequently, the value of "A+B" as an output from the PD 1149 varies. Obviously, therefore, the above "threshold value", "focus capture range", and "integral time" must be changed for each objective lens.

In addition, the depth of focus on the observation sample side varies depending on the NA and magnification of an objective lens. Obviously, therefore, "in-focus allowable range" and "focus feed step" must be changed for each objective lens. "Focus search range" must also be properly set for each objective lens because, for example, as the WDs of objective lenses differ from each other, the risk of collision between an observation sample and the distal end of the objective lens varies. It is therefore necessary to properly set "focus search range" for each objective lens.

The control unit 1138 automatically sets parameters for focus detection to optimal values for a given objective lens on the basis of the type of objective lens on the optical path which is detected by the revolver 1106. That is, focus detection parameters can be changed in accordance with changes in the magnifications of the focus detection optical path and observation optical path. In this case, the observation optical path is an optical path from the objective lens 1105 to the CCD 1136 through the optical path switching prism 1121.

Note that these parameters for focus detection vary in proper value depending on the reflectance of an observation sample other than the objective lens. In this embodiment, however, since laser light reflected by the boundary surface between the cover glass 1104 and the observation object 1103 is detected, the reflectance does not greatly vary depending on the observation sample, and the focus detection parameters are not changed. When, however, observation samples which greatly differ in reflectance are to be observed, the parameters must be changed and set independently to proper values.

The high-NA objective lens dedicated beam restriction stop 1143 will be described next.

As described above, focus detection is performed by using the reflection of laser light by the boundary surface between the cover glass 1104 and the observation object 1103. However, a laser light beam with NA larger than the refractive index of an observation object is totally reflected by the boundary surface between the cover glass 1104 and the observation object 1103. The reflectance of the observation object is several hundred times higher than that of laser light with NA smaller than the refractive index of the observation object. For example, the NA of an oil objective lens with a magnification of about 60× or 100× is about 1.45. Since an observation object (e.g., a cell or culture solution) has a refractive index of about 1.33 to 1.38, laser light with an NA of 1.38 to 1.45 is totally reflected by the boundary surface between the cover glass 1104 and the observation object 1103. Laser light with an NA within this range, in particular, tends to become stray light due to scattering by the frame of the objective lens or the like because the light is transmitted through a region around the pupil of the objective lens, i.e., a portion inside the objective lens which is near its frame. The generated stray light adversely affects the focus precision.

If, therefore, the objective lens inserted on the optical path by the revolver 1106 is detected and has an NA larger than the refractive index of the observation object, the control unit 1138 inserts the high-NA objective lens dedicated beam restriction stop 1143 in the optical path through the motor 1175. The high-NA objective lens dedicated beam restriction stop 1143 restricts only light beams with NAs larger than the refractive index of the observation object, and hence no flare or the like is generated, thus eliminating adverse influences on the focus precision.

In other words, the diameter of a laser light beam used for focus detection is equivalent to an NA smaller than the refractive index of the observation object. If the NA of the objective lens is larger than the refractive index of the observation object, the high-NA objective lens dedicated beam restriction stop 1143 is inserted in the optical path by the control unit 1138 and motor 1175 to make the diameter of a laser light beam smaller than the refractive index of the observation object. The high-NA objective lens dedicated beam restriction stop 1143 is a beam diameter restriction stop for reducing the diameter of a laser light beam. The motor 1175 and control unit 1138 constitute a stop control unit which properly places the high-NA objective lens dedicated beam restriction stop 1143 on the optical path of a laser light beam. In addition, the high-NA objective lens dedicated beam restriction stop 1143, motor 1175, and control unit 1138 constitute a beam diameter changing unit which changes the diameter of a laser light beam.

Even objective lenses with the same NA equivalent to the refractive index of an observation object differ in pupil diameter if they have different magnifications. In this case, therefore, high-NA objective lens dedicated beam restriction stops 1143 with different stop diameters must be prepared. Referring to FIG. 15A, although only one type of high-NA objective lens dedicated beam restriction stop 1143 is prepared, high-NA objective lens dedicated beam restriction stops with different stop diameters may be prepared to be inserted/withdrawn on/from the optical path.

In this embodiment, since the diameter of a laser light beam used for focus detection is equivalent to an NA smaller than the refractive index of an observation object, the laser light beam is not totally reflected by the boundary surface between a transparent member (e.g., the cover glass or slide glass) and the observation object. This suppresses the generation of stray light. That is, stray light originating from a laser light beam is minimized. This makes it possible to reduce noise on a focus signal, thus maintaining the focus more stably.

In addition, only when the NA of an objective lens is larger than the refractive index of an observation object, the diameter of a laser light beam is changed to become smaller than the refractive index of the observation object. When, therefore, an objective lens having an NA larger than the refractive index of the observation object and a large pupil diameter is used, a laser light beam with a large diameter can be ensured in accordance with the pupil diameter can be ensured, and a laser light beam with sufficient power for focus detection can be applied to an observation sample. This makes it possible to stably maintain the focus.

The influence of a temperature change at the time of focus maintenance will be described next.

As the imaging lens 1139 which collimates a laser light beam exiting from the LD 1145 and condenses the laser light beam onto the PD 1149, a lens which has the same curvature and thickness and is made of the same material as those of the imaging lens 1120 in the microscope body 1169 is used. Therefore, the emission point of the LD 1145 is optically conjugate to the objective lens primary image planes 1130a and 1130b. That is, even if an objective lens primary image plane moves (defocuses) in the optical axis direction due to a change in the temperature of the lens, since the objective lens primary image plane or the focus detection optical path and observation optical path move by the same amount, no relative focus shift occurs between the focus detection optical path and the observation optical path as long as the microscope focus maintaining device operates normally. This makes it possible to maintain the focus even with a change in room temperature or a change in temperature due to heat generated by the light source or power supply for the microscope. In this case, the observation optical path is applied to an optical path on the CCD 1136 side on which observation is performed with an objective lens primary image plane.

In this embodiment, the focus drift of the focus detection optical system due to a temperature change is the same as that of the observation optical system. For this reason, even if the room temperature changes, no focus drift difference occurs between the focus detection optical system and the observation optical system due to a temperature change. This makes it possible to stably maintain the focus in long-time lapse observation with a change in room temperature. In addition, since both the focus detection optical system and the observation optical system are formed through the objective lens, even if a focus drift occurs on the objective lens itself, the drift of the focus detection optical system becomes the same as that of the observation optical system. This makes it possible to stably maintain the focus even if the objective lens is exchanged for a different objective lens.

In addition, since the focus detection optical system and observation optical system are formed from identical members, the focus drift of the focus detection optical system due to a temperature change can be reliably and easily made equal to that of the observation optical system.

Furthermore, since both the focus detection optical system and the observation optical system are imaging optical systems for objective lens primary images, the focus drift of the focus detection optical system due to a temperature change can be made equal to that of the observation optical system at low cost and with space saving.

In this embodiment, since the focus drift of the focus detection optical path due to a temperature change is equal to that of the observation optical path, there is no need to use the chromatic aberration correction mechanism (the chromatic aberration correction lens group 677, chromatic aberration lens group driving motor 683, and chromatic aberration lens driving unit 684) in the sixth embodiment. This also applies to the following embodiments.

A sequence in which an examiner performs time lapse observation of a living cell by using the device of this embodiment will be described next.

The mercury lamp 1114 serving as a light source for fluorescence illumination is turned on in advance in the case of fluorescence observation, or the light source 1111 is turned on in advance in the case of transmitted illumination observation. In addition, a desired objective lens 1105, a fluorescence filter corresponding to a fluorescent dye staining a cell in the observation object 1103 in the case of fluorescence observation, and the dichroic mirror 1134 which guides a laser light beam for focus detection are placed on the optical path in advance. Obviously, the control unit 1138 automatically recognizes parameters for focus detection in accordance with the type of objective lens detected by the revolver 1106, and the high-NA objective lens dedicated beam restriction stop 1143 is automatically inserted/withdrawn as needed. The optical path switching prism 1121 is placed outside the observation optical axis 1108 at first to allow the examiner to observe with the eyes.

The examiner sets the observation object 1103, placed on the cover glass 1104, on the X-Y stage 1129. The examiner then adjusts the focus by rotating the focusing handle 1124, and at the same time searches for a place to be observed by moving the X-Y stage 1129. In general, the observer can observe a wider range with the eyes than with the CCD 1136, and hence searches for a place to be observed with the eyes. However, no problem arises if the examiner searches for a place with the CCD 1136. The optical path switching prism 1121 is then inserted in the observation optical axis 1108 to switch to the optical path of the CCD 1136. By pressing a focus maintenance button provided on the input unit 1172 connected to the control unit 1138, the focus maintaining function is activated to accurately focus on the boundary surface between the observation object 1103 and the cover glass 1104, thereby displaying a microscopic image of the observation object 1103 on the monitor of the CCD 1136 (not shown). The observer then moves a place to be precisely observed to the center of the monitor by using the X-Y stage 1129.

Subsequently, the examiner operates the input unit 1172 to input time intervals at which images of the observation object 1103 are to be acquired and a total time for a time lapse experiment. When the examiner presses a time lapse experiment start button provided on the input unit 1172, the focus maintaining function is activated at the set time intervals. Thereafter, exposure on the CCD 1136 is performed, and the resultant image is automatically stored in a memory 1173. This cooperative operation is controlled by the control unit 1138.

In this embodiment, the X-Y stage 1129 is manually operated. If, however, this stage is motorized and the positions of cells in different places are stored, the above time lapse observation can be performed on many cells at many regions.

According to this embodiment, since microscopic images can be acquired and stored at predetermined time intervals even if the examiner does not always stay at the microscope, the load on the examiner can be greatly reduced. In addition, since laser light used for focus detection has a wavelength of 800 nm, which is different from the wavelength of light used for fluorescence observation and transmitted illumination observation, there is no possibility that observation light becomes stray light. Furthermore, since the dichroic mirror which reflects the wavelength of laser light and transmits visible light as observation light is used when a laser light beam used for focus detection is to be guided to the observation optical axis, no loss of both laser light and observation light occurs. This allows observation with high brightness and can maintain the focus more stably. Moreover, since a laser light beam is guided from a side closer to the objective lens than the fluorescence filter, no laser light is transmitted through the filter, and hence no loss of light occurs. This makes it possible to maintain the focus more stably.

In this embodiment, the lenses having the same optical characteristics are used for the focus detection optical path and observation optical path. However, identical lenses may not be used as long as lenses exhibiting the same optical focus drift. In this embodiment, the LD 1145 and PD 1149 are arranged on an objective lens primary image plane, and an objective lens primary image is observed with the CCD 1136. However, an objective lens primary image need not always be used. If identical lenses or lenses exhibiting the same optical focus drift are used for the focus detection optical path and observation optical path, the same effects as described above can be obtained.

In addition, if an observation optical path with the eyes is formed in the same manner, the focus can be maintained in the same manner not only by observation with the CCD 1136 but also by observation with the eyes. Although not shown, the same arrangement as that for observation with the eyes is formed, the same effects as described above can be obtained regardless of whether the observation optical path is a confocal optical system based on a disk scan scheme or a detection optical system for a laser microscope.

Note that a detection optical system for a laser microscope is often mounted in place of, for example, an epi-fluorescence illumination device or the CCD 1136. In this case, however, if the objective lens is raised, a galvano mirror which scans a laser light beam becomes not conjugate to the pupil position of the objective lens, resulting in insufficiency of the amount of peripheral light or the like. This problem can be solved by moving a pupil projection lens which projects the galvano mirror on the pupil of the objective lens in the optical axis direction or designing the galvano mirror to be movable in the optical axis direction.

In addition to optical focus drifts, there exist focus drifts due to the thermal expansion of the holding members of optical elements and the like. If the same material used for the holding members of optical elements on the focus detection optical path and observation optical path to eliminate the influences of such focus drifts, the focus maintenance precision can be further improved.

This embodiment has exemplified the microscope focus maintaining device based on the pupil division laser projection scheme. If, however, a focus detection optical path and observation optical path are independent of each other as in the case of a confocal scheme in which a pinhole is formed in an image plane to detect a focus position where the amount of light transmitted through the pinhole is maximized, the same function and effect can be obtained as described above.

Eighth Embodiment

Figure 16A:
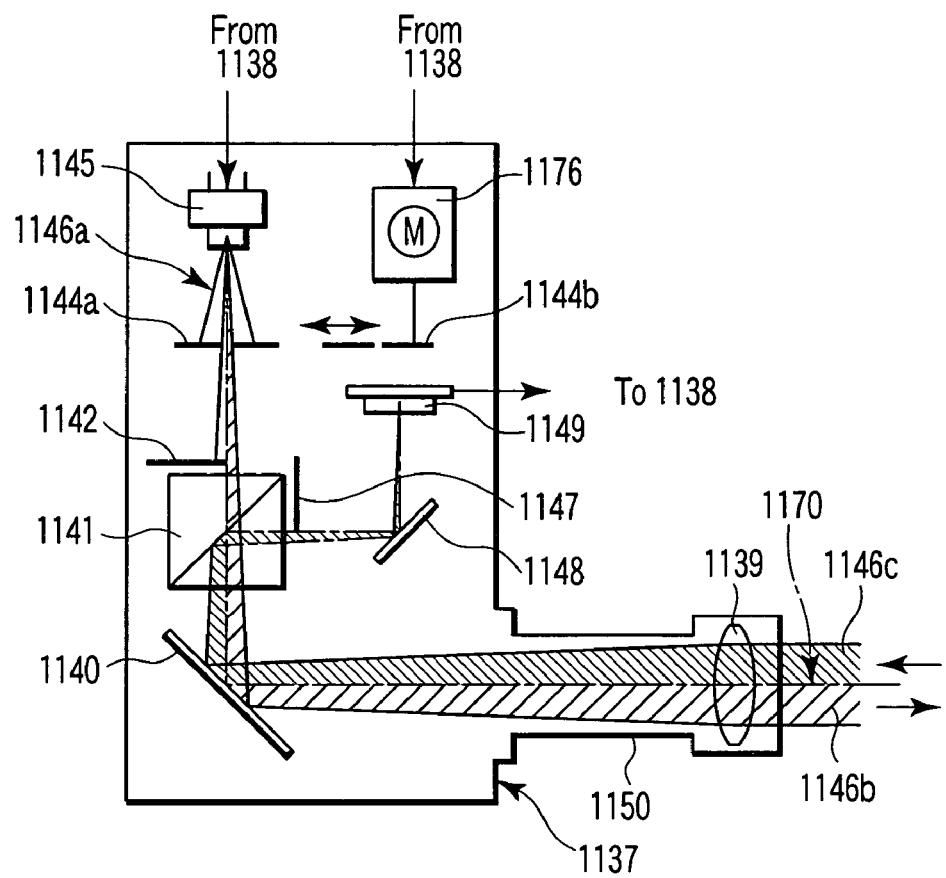
FIG. 16A is a plan view of a sensor head in the eighth embodiment of the present invention.
Figure 16B:
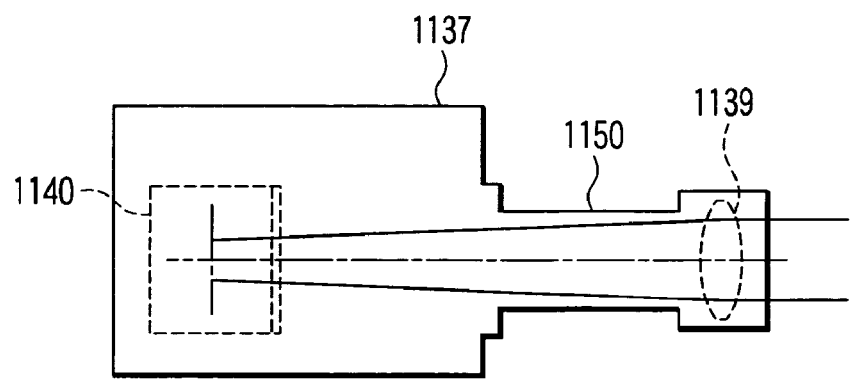
FIG. 16B is a front view of the sensor head shown in FIG. 16A.

The eighth embodiment of the present invention will be described next with reference to FIGS. 16A and 16B. This embodiment is directed to a sensor head which can replace the sensor head in the seventh embodiment. FIG. 16A is a plan view of the sensor head according to the eighth embodiment of the present invention. FIG. 16B is a front view of the sensor head shown in FIG. 16A.

A microscope and an optical path switching unit on the microscope side of a microscope focus maintaining device are the same as those in the seventh embodiment shown in FIG. 13, and a sensor head 1137 differs only partly from that in the seventh embodiment. Therefore, only different portions will be described below. With regard to other arrangements, the same reference numerals as in the eighth embodiment denote the same parts in the seventh embodiment, and a detailed description thereof will be omitted.

For the sensor head 1137 in this embodiment, beam diameter restriction stops 1144a and 1144b with different stop diameters are arranged immediately after an LD 1145 in place of the high-NA objective lens dedicated beam restriction stop 1143 in the seventh embodiment. Although FIG. 13 representatively shows the two beam diameter restriction stops 1144a and 1144b, the number of beam diameter restriction stops is not limited to two. The stop diameter of each of the beam diameter restriction stops 1144a and 1144b coincides with the pupil of a corresponding objective lens to be paired. A control unit 1138 inserts one of the beam diameter restriction stops 1144a and 1144b which has a stop diameter equal to the pupil diameter of the objective lens on the optical path into the optical path through a motor 1175 in accordance with information indicating the type of objective lens on the optical path which is detected by a revolver 1106.

In other words, the beam diameter restriction stops 1144a and 1144b have openings with diameters coinciding with the pupils of objective lens prepared in advance which can be placed on the optical path. Of the beam diameter restriction stops 1144a and 1144b, a beam diameter restriction stop having an opening with the same diameter as the pupil diameter of the objective lens on the optical path is selectively placed on the optical path by the control unit 1138 and motor 1175. That is, the focus detection optical system can change the diameter of a laser light beam, and changes the diameter of a laser light beam to a diameter equal to the pupil diameter of the objective lens. The control unit 1138 and motor 1175 constitute a stop control unit which selectively places one of the beam diameter restriction stops 1144a and 1144b on the optical path of a laser light beam from the LD 1145. The beam diameter restriction stops 1144a and 1144b, motor 1175, and control unit 1138 constitute a beam diameter changing unit which changes the diameter of a laser light beam.

If the stop diameter of a beam diameter restriction stop 1144, i.e., the pupil diameter of an objective lens, is large, the power of the LD 1145 is decreased, otherwise the power of the LD 1145 is increased. In this manner, the control unit 1138 controls the power of laser light striking an objective lens 1105 to be constant.

In other words, the control unit 1138 forms a power changing unit which changes the power of the LD 1145, and changes the power of the LD 1145 to keep the power of a laser light beam striking the objective lens on the optical path constant regardless of the diameter of the laser light beam.

According to conventional laser projection type focus detection, the diameter of a laser light beam and laser power are constant regardless of the pupil diameter of an objective lens. When laser light reflected by a surface to which a cover glass, slide glass, or the like adheres like a biological observation sample is to be detected, the reflectance may be too low, and the power of laser light striking a light-receiving element for laser detection may be insufficient. When an objective lens having a small pupil diameter is to be used, in particular, only part of a projected laser light beam enters the objective lens. For this reason, the power of laser light striking the observation sample is too low for focus detection.

This problem can be solved by increasing the output level of the laser light source itself. If, however, the laser power is increased, a living cell in the observation sample is more damaged, and the degree of risk of trouble to the skin or eyes of an observer by laser light increases. In addition, the apparatus requires a safety device for avoiding this, and hence increases in size and cost. Assume that the power of a laser serving as a light source is increased in accordance with an objective lens having a small pupil diameter through which the power of laser light striking a light-receiving element for laser detection becomes low. In this case, when this objective lens is replaced with an objective lens with a large pupil diameter or is removed, laser light with higher power strikes the observation sample. This further increases damage to a cell or the degree of risk of trouble to the observer.

In this embodiment, the diameter of a laser light beam and the laser power of the light source can be changed in accordance with the pupil diameter of an objective lens. This makes it possible to maintain the laser power which allows focus detection while minimizing the power of laser light which may strike a cell or examiner. That is, the embodiment can maintain the laser power which allows focus detection while minimizing damage to a cell and avoiding trouble to the examiner by laser light.

In addition, since the diameter of a laser light beam is made equal to the pupil diameter of an objective lens, the whole projected laser light beam is transmitted through the objective lens without being vignetted by the objective lens regardless of the objective lens to be used. This can prevent noise from being superimposed on a focus signal due to flare generated by frame reflection or the like.

Furthermore, the laser power of the LD 1145 is changed so as not to change the power of laser light striking an objective lens even with a change in the diameter of a laser light beam. This can make the power of laser light on an observation sample constant regardless of the objective lens to be used, and can maintain the laser power which allows focus detection while minimizing the power of laser light which may strike a cell or examiner. That is, this embodiment can maintain the laser power which allows focus detection while minimizing damage to a cell and avoiding trouble to an examiner by laser light.

According to the above arrangement and function, since the power of laser light striking an objective lens is kept constant regardless of the type of objective lens, i.e., the pupil diameter, a laser light beam is not vignetted by the frame of even an objective lens with a small pupil diameter as compared with a case wherein the diameter of a laser light beam is set in accordance with an objective lens with a relatively large pupil diameter as in the seventh embodiment. For this reason, higher laser power can be used for focus detection, and hence the focus can be maintained stably.

In addition, there is conceivable a method of making the power of laser light striking an objective lens constant by changing only the laser power in accordance with the pupil diameter of the objective lens while keeping a beam diameter constant. In this method, however, since the power of laser light exiting from the objective lens mount screw holes of the revolver 1106 is not constant, if an objective lens is erroneously removed while the laser power is high, the human body may be damaged by the laser power. In this embodiment, however, since the power of laser light exiting from such a screw hole is kept always constant even if the objective lens is removed, there is no danger as long as the laser power is set in advance to safe power for the human body.

In this embodiment, one of the beam diameter restriction stops 1144 is selected and inserted/withdrawn on/from the optical path to restrict the beam diameter. However, the same function and effect can be obtained even by using a beam diameter restriction stop whose stop diameter can be changed.

In addition, in this embodiment, the beam diameter is restricted by using different stop diameters to make the power of laser light striking an objective lens constant. As in the seventh embodiment, however, the type of objective lens placed on the optical path may be recognized to set a beam diameter which prevents total reflection at the boundary surface between a cover glass 1104 and an observation object 1103 as needed. In this case as well, the same effects as described above can be obtained by keeping the power of laser light striking the objective lens constant.

Modification to Eighth Embodiment

A modification to the eighth embodiment will be described next.

In the eighth embodiment, the stop diameter of a beam diameter restriction stop can be changed in accordance with the pupil diameter of an objective lens. In this modification, however, the stop diameter of a beam diameter restriction stop is set in accordance with one of objective lenses used in combination which has the smallest pupil diameter. That is, the diameter of a laser light beam is equal to the pupil diameter of one of objective lenses prepared in advance which is smallest.

As a consequence, the power of laser light striking an objective lens is constant regardless of the pupil diameter of the objective lens, and the same effects as those in the eighth embodiment can be obtained. In addition, even if the objective lens is removed, the laser power remains constant, and the same effects as describe above can be obtained. In addition, even if the objective lens is removed, the laser power remains constant and the beam diameter restriction stop and the power of an LD 1145 remain unchanged. This improves the reliability and provides safety for the human body. In the case of an objective lens with a low magnification and large pupil diameter, since a laser light beam does not coincide with the pupil, the depth of focus increases, and the focus detection precision slightly decreases. However, the focus drift of a low-magnification objective lens due to a change in room temperature is small. In addition, in time lapse observation, since a high-magnification objective lens with a small pupil diameter is mainly used, no practical problems arise.

Ninth Embodiment

Figure 17A:
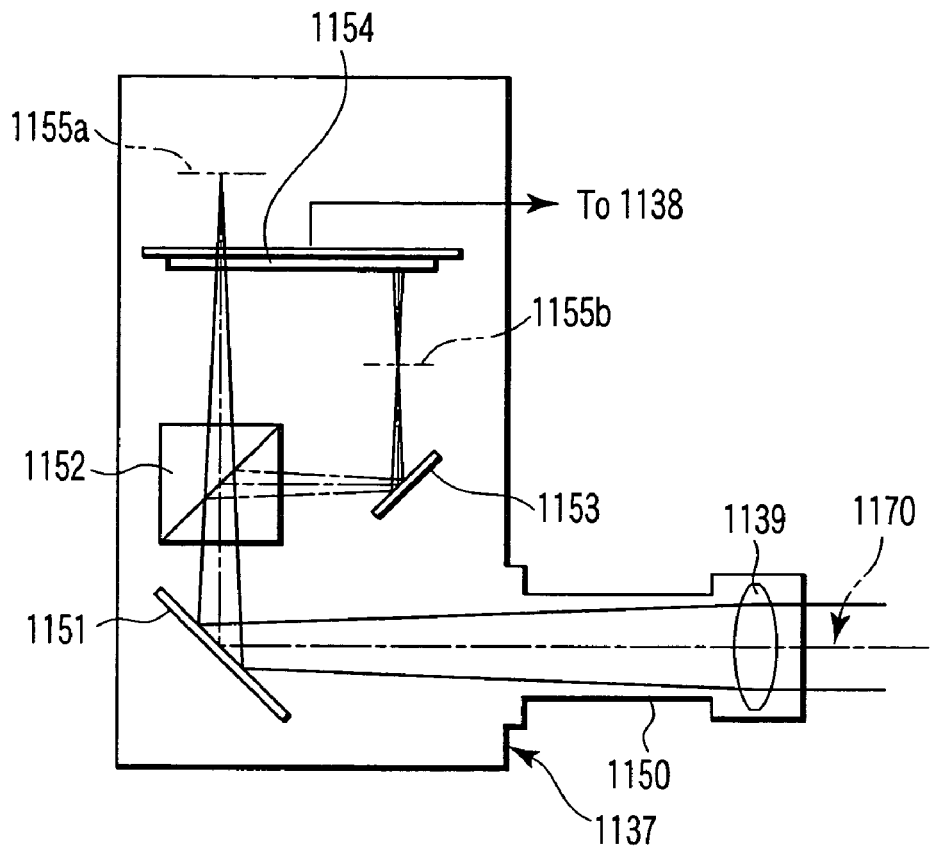
FIG. 17A is a plan view of a sensor head in the ninth embodiment of the present invention.
Figure 17B:
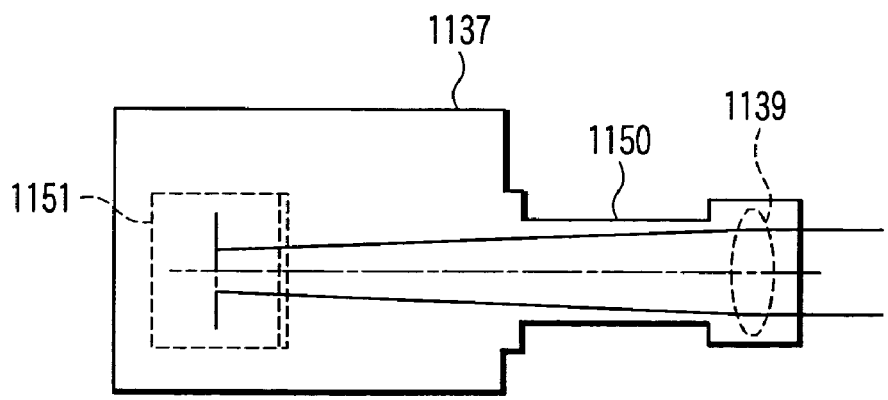
FIG. 17B is a front view of the sensor head shown in FIG. 17A.

The ninth embodiment of the present invention will be described next with reference to FIGS. 17A and 17B. This embodiment is directed to a sensor head which can replace the sensor head in the seventh embodiment. FIG. 17A is a plan view of the sensor head according to the ninth embodiment of the present invention. FIG. 17B is a front view of the sensor head shown in FIG. 17A.

A microscope and an optical path switching unit on the microscope side of a microscope focus maintaining device in this embodiment are the same as those in the seventh embodiment shown in FIG. 13, and a sensor head 1137 differs from that in the seventh embodiment. Therefore, only the sensor head 1137 will be described below. With regard to other arrangements, the same reference numerals as in the ninth embodiment denote the same parts in the seventh embodiment, and a detailed description thereof will be omitted.

The sensor head 1137 in this embodiment is based on a scheme of achieving an in-focus state by detecting the contrast of an image unlike the laser projection type microscope focus maintaining devices according to the seventh and eighth embodiments. Referring to FIG. 17A, an imaging lens 1139 is identical to the imaging lens 1120 incorporated in the microscope in the seventh embodiment.

Of transmitted illumination observation light or fluorescence observation light exiting from an objective lens 1105, light with wavelengths of 800 nm or more which is reflected by a dichroic mirror 1134 is condensed by the imaging lens 1139 and reflected by a mirror 1151. Part of this light is transmitted through a beam splitter 1152 to form an objective lens primary image 1155a at a position slightly away from a CCD line sensor 1154. On the other hand, the light reflected by the beam splitter 1152 is reflected by a mirror 1153 to form an objective lens primary image 1155b at a position slightly before the CCD line sensor 1154.

A focus detection method in this arrangement will be described briefly. The focus detection method is disclosed in, for example, Jpn. Pat. Appln. KOKAI Publication No. 6-78112.

The CCD line sensor 1154 is roughly divided into two regions with the center of the interval between the optical axis of the objective lens primary image 1155a and the optical axis of the objective lens primary image 1155b being a boundary. The objective lens primary image 1155a side will be referred to as near focus; and the objective lens primary image 1155b side, far focus. A control unit 1138 can compute a contrast by calculating the luminance difference between adjacent pixels in each of the near-focus and far-focus regions of the CCD line sensor 1154.

Since the objective lens primary images 1155a and 1155b are formed at equal distances from the CCD line sensor 1154, focus detection is performed by determining, as an in-focus position, a position where the contrast at the near focus becomes equal to that at the far focus. In practice, the control unit 1138 controls focus driving by a motor 1123 to allow a CCD 1136 to image and store a time lapse image in an in-focus state.

If the observation wavelength is shorter than 800 nm in the case of fluorescence observation, when an in-focus state is achieved upon focus detection with transmitted illumination observation light, imaging may be performed by the CCD 1136 upon switching to fluorescence observation by inserting a fluorescence filter in an optical path. Alternatively, even when fluorescence observation is performed with a wavelength of 800 nm or more, the above operation may be done if no excitation light is to be applied to a cell in an observation object 1103 to reduce damage to the cell.

In this embodiment, with the above arrangement and function, the same effects as those in the seventh embodiment can be obtained even with the optical path difference contrast scheme. The above combination is effective for an observation sample or experiment for which it is convenient to determine a position where the contrast is high as an in-focus position.

10th Embodiment

Figure 18:
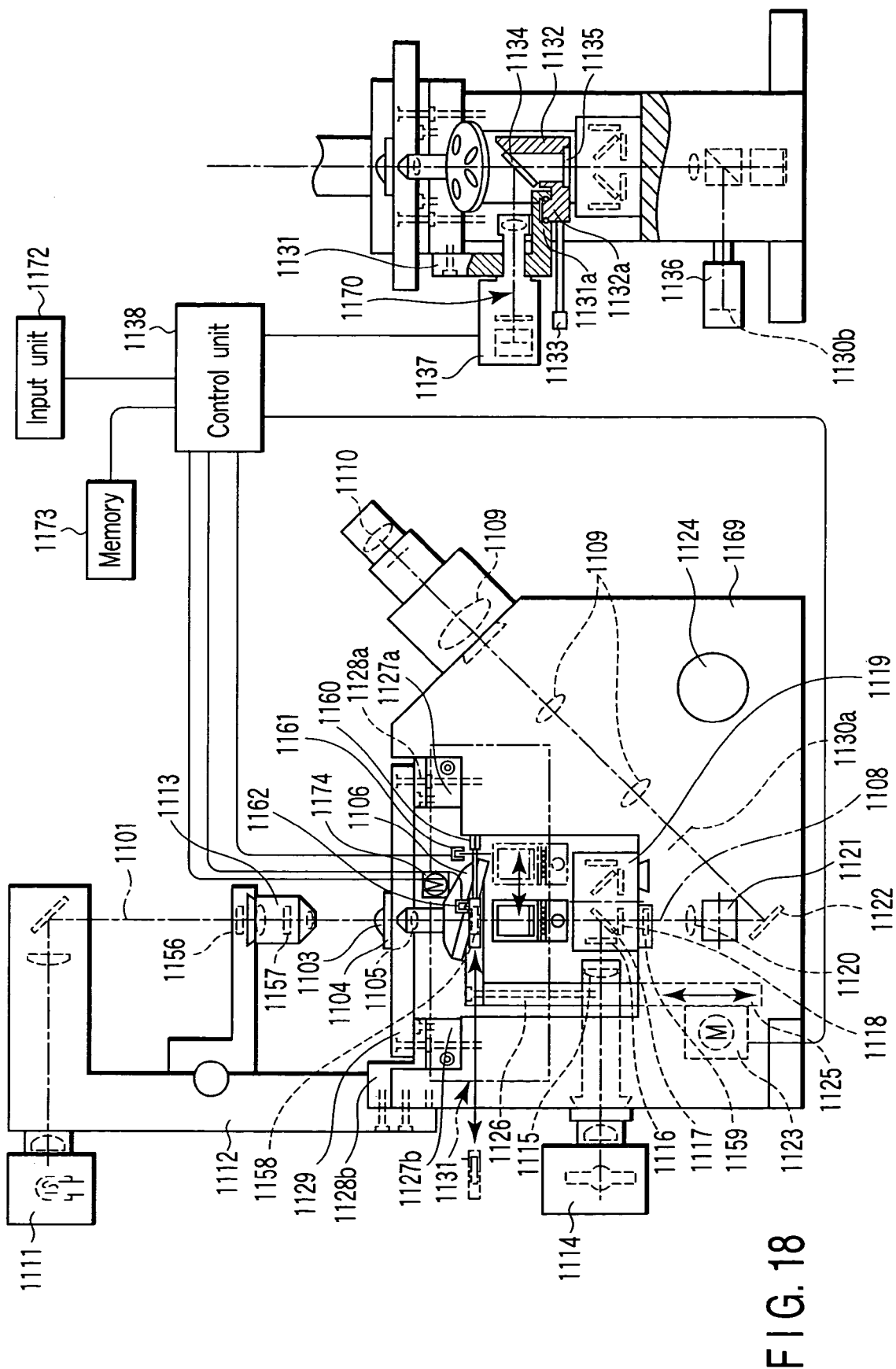
FIG. 18 is a view showing the overall arrangement of a microscope according to the 10th embodiment of the present invention.
Figure 19A:
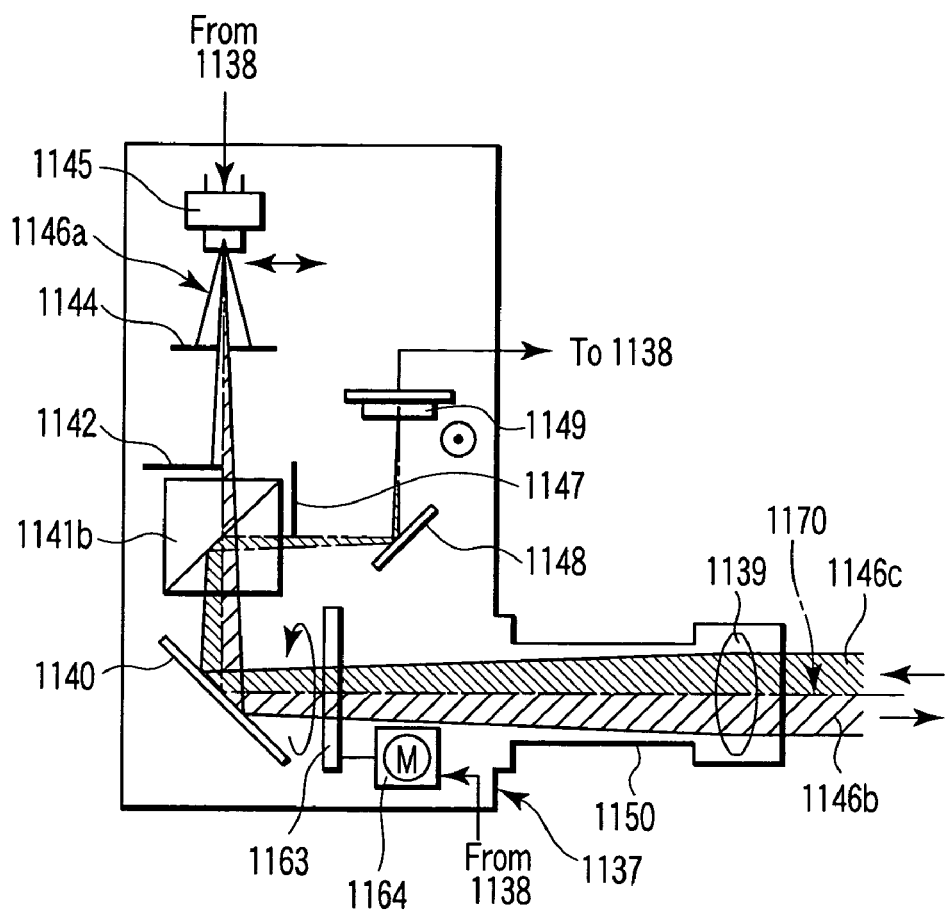
FIG. 19A is a plan view of a sensor head shown on the right side of FIG. 18.
Figure 19B:
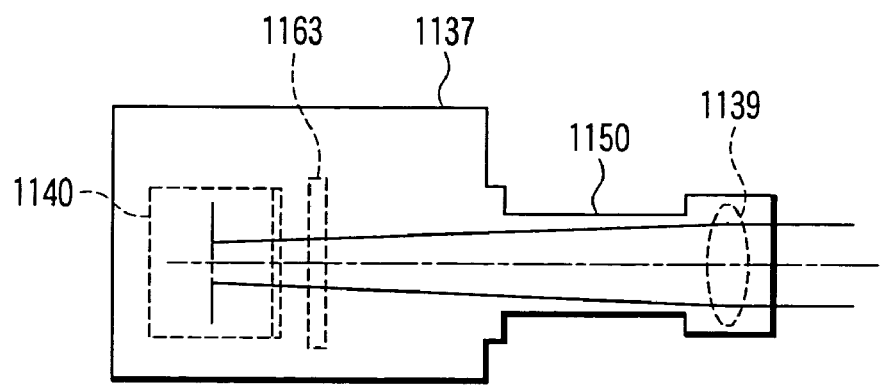
FIG. 19B is a front view of the sensor head shown in FIG. 19A.

The 10th embodiment of the present invention will be described next with reference to FIGS. 18, 19A, and 19B. This embodiment is directed to a microscope including a microscope focus maintaining device. FIG. 18 shows the overall arrangement of the microscope according to the 10th embodiment of the present invention. Referring to FIG. 18, a side surface of the microscope is shown on the left side, and portions around the objective lens of the microscope are shown on the right side. FIG. 19A is a plan view of a sensor head shown on the right side of FIG. 18. FIG. 19B is a front view of the sensor head shown in FIG. 19A.

An optical path switching unit on the microscope side of a microscope focus maintaining device is the same as that in the seventh embodiment, and the microscope is also the same as that of the seventh embodiment except that transmitted illumination observation is limited to differential interference observation. A sensor head 1137 differs only partly from that in the seventh embodiment. Therefore, only different portions will be described below. With regard to other arrangements, the same reference numerals as in the 10th embodiment denote the same parts in the seventh embodiment, and a detailed description thereof will be omitted.

The arrangement and function of differential interference observation will be described with reference to FIG. 18.

In addition to the arrangement of the seventh embodiment described above, on a transmitted illumination optical axis 1101, a polarizer 1156 is placed above a condenser lens 1113, and an illumination-side DIC prism 1157 is placed in the condenser lens 1113, whereas on an observation optical axis 1108, an observation-side DIC prism 1158 is placed in a revolver 1106, and an analyzer 1159 is placed such that its vibration direction is perpendicular to the polarizer 1156. The observation-side DIC prism 1158 is held by the revolver 1106 so as to be inserted/withdrawn on/from the observation optical axis 1108, and can be moved in a direction perpendicular to the observation optical axis 1108 by rotating a contrast adjustment knob 1160. This makes it possible to adjust the contrast of a DIC image by changing the retardation. That is, the observation-side DIC prism 1158 forms a retardation changing element for differential interference observation. In addition, insertion/withdrawal of the observation-side DIC prism 1158 on/from the observation optical axis 1108 and a change in retardation by the contrast adjustment knob 1160 are detected by sensors 1161 and 1162 and can be recognized by a control unit 1138.

In this arrangement, the illumination light emitted from a light source 1111 of a transmitted illumination pillar 1112 is converted into linearly polarized light by the polarizer 1156, made to cause a predetermined retardation by the observation-side DIC prism 1158, and split into ordinary light and extraordinary light to illuminate an observation object 1103 and cover glass 1104. An image from the observation object 1103 is projected at infinity by an objective lens 1105, and is made to cause a predetermined retardation by the observation-side DIC prism 1158. The ordinary light and extraordinary light are combined and transmitted through the analyzer 1159. Subsequently, this light can be observed with the CCD 1136, the eyes, or the like as in the case of transmitted illumination observation in the seventh embodiment.

The arrangement of the sensor head 1137 will be described next with reference to FIGS. 19A and 19B.

The 10th embodiment differs from the seventh embodiment in that a beam diameter restriction stop 1144 is fixed for the sake of simplicity, the beam splitter 1141 is replaced with a polarizing beam splitter (PBS) 1141b, and a λ/4 plate 1163 is placed closer to the imaging lens side than the PBS 1141b. The λ/4 plate 1163 can be rotated and controlled by a motor 1164 under the control of the control unit 1138. The λ/4 plate 1163, motor 1164, and control unit 1138 constitute a retardation correction device which generates a retardation for canceling out the retardation caused by the observation-side DIC prism 1158. The PBS 1141b has the property of transmitting linearly polarized light in the direction indicated by the arrow which is parallel to the drawing surface of FIG. 19A and reflects linearly polarized light in a direction perpendicular to the drawing surface.

The function of the sensor head with this arrangement will be described in association with a case wherein no differential interference observation is performed.

A laser light beam exiting from an LD 1145 is linearly polarized light in the direction indicated by the arrow in FIG. 19A. This laser light beam is transmitted through the beam diameter restriction stop 1144, a pupil division stop 1142, and the PBS 1141b and reflected by a mirror 1140. The light beam is then transmitted through the λ/4 plate 1163 to be circularly polarized, and is collimated by an imaging lens 1139 to exit to the objective lens 1105. In this case, if no differential interference observation is performed, the control unit 1138 recognizes on the basis of the sensor 1162 that the observation-side DIC prism 1158 is not placed on the optical path, and causes the motor 1164 to set the λ/4 plate 1163 at a position where its optical axis tilts at 45° with respect to the polarization direction of the LD 1145.

The laser light beam which has returned from the objective lens 1105 is condensed by the imaging lens 1139, is transmitted through the λ/4 plate 1163, and the circularly polarized light is converted into linearly polarized light perpendicular to the polarization direction of the LD 1145. This light is reflected by the PBS 1141b, transmitted through the pupil division stop 1147, and strikes a PD 1149, thereby determining an in-focus position upon focus detection in the same manner as in the seventh embodiment. As described above, when no differential interference observation is performed, since the laser projection optical path is polarization-split from the detection optical path, both the optical paths are transmitted through the PBS 1141b without any loss. This improves the utilization efficiency of reflected laser power.

A function in the case of differential interference observation will be described next.

Since the internal arrangement of the sensor head 1137 is the same as that in the case of differential interference observation except for the rotating direction of the λ/4 plate 1163, a description thereof will be omitted. A laser light beam 1146b exiting from the sensor head 1137 is reflected by a dichroic mirror 1134, transmitted through the observation-side DIC prism 1158, and condensed onto the observation object 1103 by the objective lens 1105. This light beam is reflected by the boundary surface between the cover glass 1104 and the observation object 1103 and projected at infinity by the objective lens 1105. In addition, the light beam is transmitted through the observation-side DIC prism 1158 and returns to the sensor head 1137.

In this case, since the light beam is transmitted through the observation-side DIC prism 1158 twice, a retardation also occurs here. As a consequence, if the optical axis of the λ/4 plate 1163 remains at 45° with respect to the linearly polarized light exiting from the PBS 1141b, when the linearly polarized laser light beam exiting from the PBS 1141b is transmitted through the λ/4 plate 1163 and observation-side DIC prism twice and returns to the PBS 1141b, the light is not polarized in a direction perpendicular to the linearly polarized light exiting from the PBS 1141b. This causes a loss of laser power when the light is reflected by the PBS 1141b.

The control unit 1138 therefore causes the motor 1164 to rotate the λ/4 plate 1163 to generate a retardation which cancels out the retardation caused by the observation-side DIC prism 1158 and detected by the sensor 1161 of the contrast adjustment knob 1160. As a result, the laser light beam returning to the PBS 1141b becomes polarized light perpendicular to the linearly polarized light exiting from the PBS 1141b. This light beam is then reflected by the PBS 1141b without any loss and guided to the PD 1149. Obviously, in the case of differential interference observation, the above operation is executed after the control unit 1138 recognizes through the sensor 1162 that the observation-side DIC prism 1158 is placed on the optical path.

In this embodiment, in order to generate a retardation which cancels out the retardation caused upon contrast adjustment, the λ/4 plate 1163 is rotatably placed between the polarization beam splitter 1141b and the observation sample. This can prevent a loss of the power of laser light striking a light-receiving element for focus detection. In addition, the generated retardation is detected by the sensors 1161 and 1162, and the retardation generated by the λ/4 plate 1163 is automatically corrected by the control unit 1138 and motor 1164 on the basis of the detected retardation. This can prevent variations in laser power and can properly maintain a focus capture range.

According to the above arrangement and function, since no loss of laser power occurs on the PD regardless of whether a DIC prism is inserted/withdrawn or contrast is adjusted, the focus can be stably maintained.

In this embodiment, a retardation is canceled out by rotating the λ/4 plate prepared in advance. However, another λ/4 plate or a retardation generating element may be used.

In this embodiment, the retardation caused by the observation-side DIC prism 1158 is detected by the sensor 1161 of the contrast adjustment knob 1160, and a retardation which cancels out the detected retardation is generated. However, a retardation may be generated such that the output of the PD 1149 is maximized. This also generates a retardation which cancels out the retardation caused by the observation-side DIC prism 1158.

In addition, in this embodiment, the power of laser light striking the PD 1149 is not varied by the observation-side DIC prism. However, a parameter for focus detection, e.g., a threshold, may be changed in accordance with insertion/withdrawal of the observation-side DIC prism or the power of laser light striking the PD which is changed by a retardation.

11th Embodiment

Figure 20:
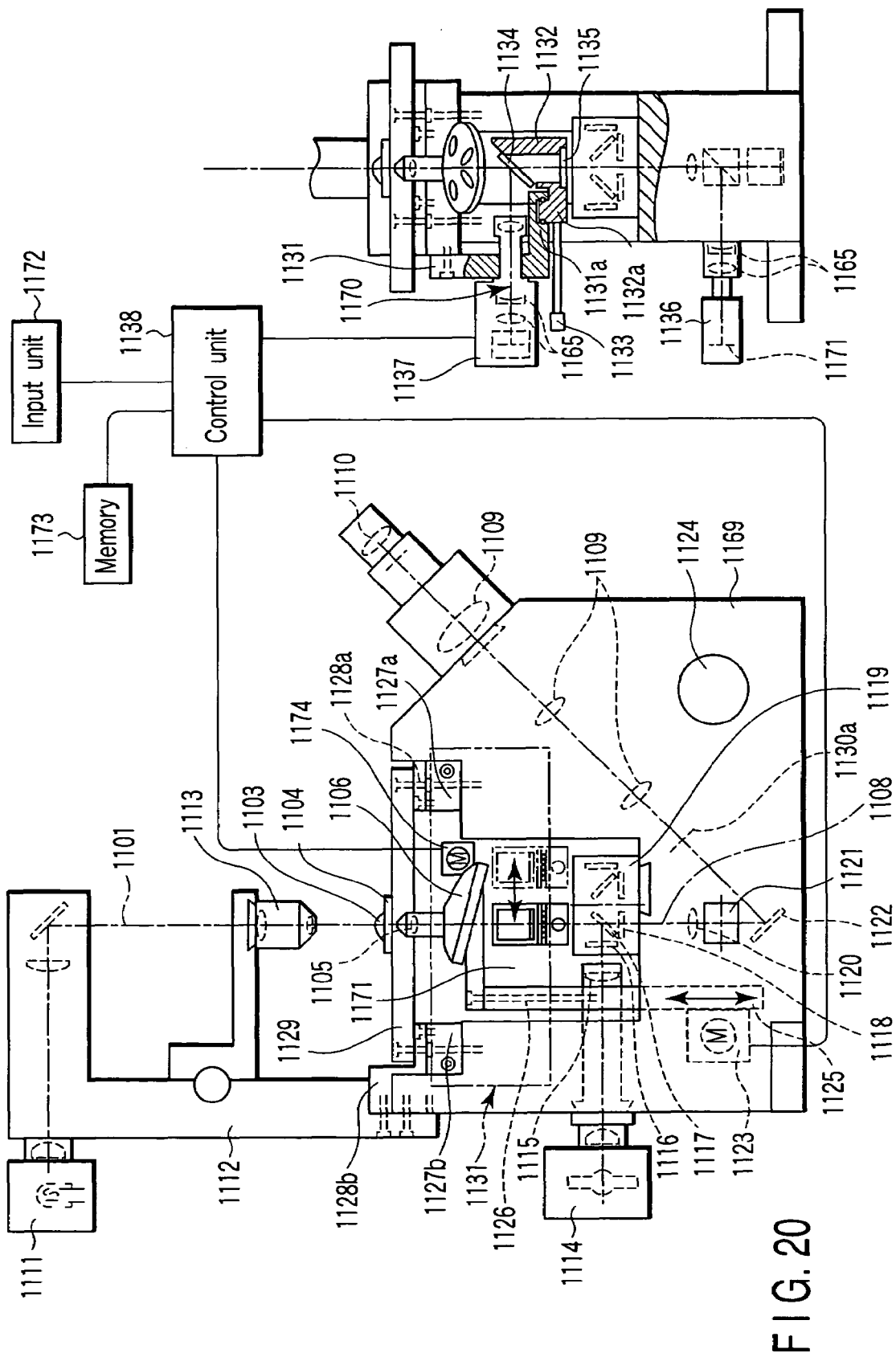
FIG. 20 is a view showing the overall arrangement of a microscope according to the 11th embodiment of the present invention.
Figure 21A:
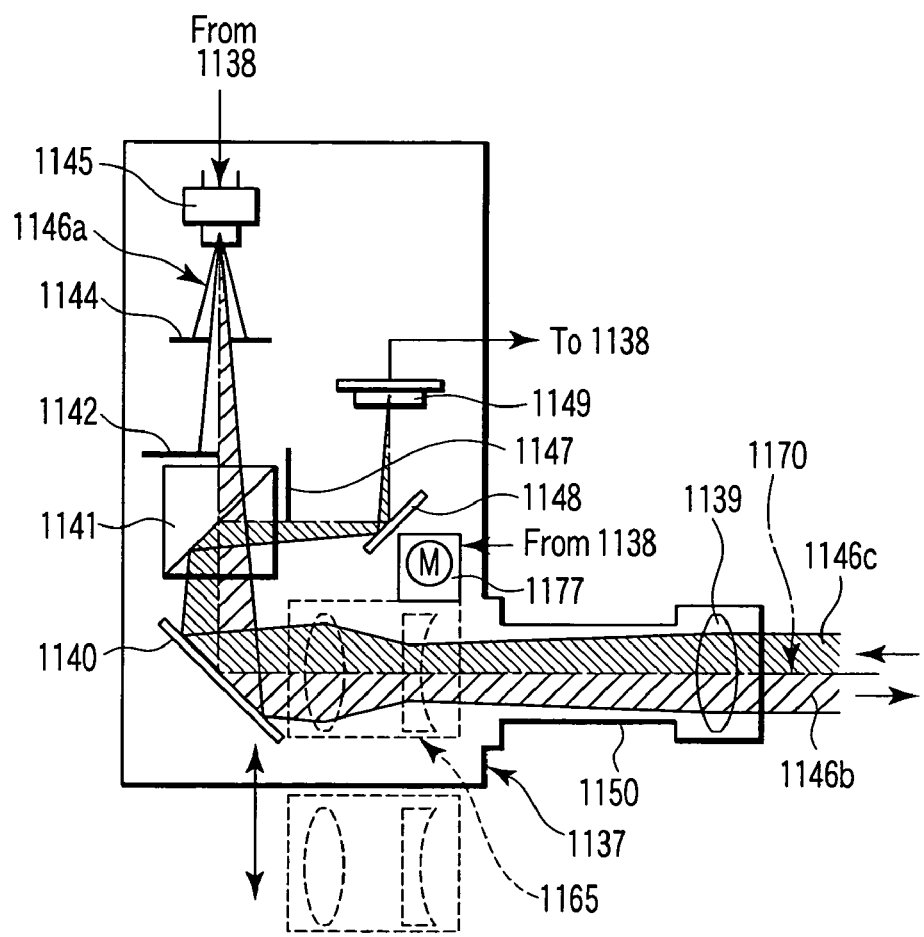
FIG. 21A is a plan view of a sensor head shown on the right side of FIG. 20.
Figure 21B:
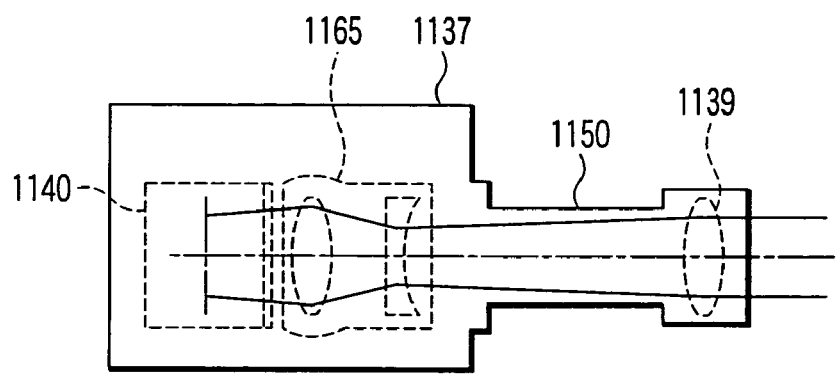
FIG. 21B is a front view of the sensor head shown in FIG. 21A.

The 11th embodiment of the present invention will be described next with reference to FIGS. 20, 21A, and 21B. This embodiment is directed to a microscope comprising a microscope focus maintaining device. FIG. 20 shows the overall arrangement of the microscope according to the 11th embodiment of the present invention. FIG. 20 shows a side surface of the microscope on the left side, together with portions around the objective lens of the microscope on the right side. FIG. 21A is a plan view of a sensor head shown on the right side in FIG. 20. FIG. 21B is a front view of the sensor head shown in FIG. 21A.

The microscope and the optical path switching unit on the microscope side of the microscope focus maintaining device shown in FIG. 20 are the same as those in the seventh embodiment except for a sensor head 1137. The sensor head 1137 differs only partly from that in the seventh embodiment. Therefore, only different portions will be described below. With regard to other arrangements, the same reference numerals as in the 11th embodiment denote the same parts in the seventh embodiment, and a detailed description thereof will be omitted.

In the seventh embodiment, both the observation optical path based on the CCD 1136 and the focus detection optical path use objective lens primary images formed by the imaging lens. With this arrangement, however, the magnification of the observation optical path cannot be changed unless the objective lens is exchanged with another objective lens.

In this embodiment, as shown in FIG. 21A, a variable power lens 1165 can be inserted/withdrawn on/from the optical path in the sensor head 1137 unlike in the seventh embodiment. In other words, the sensor head 1137 comprises the variable power lens 1165, which can be inserted/withdrawn on/from the optical path, in addition to an imaging lens 1139. The variable power lens 1165 is inserted/withdrawn on/from the optical path by a motor 1177 controlled by a control unit 1138. Referring to FIG. 21A, a beam diameter restriction stop 1144 is fixed for the sake of descriptive convenience. As shown in FIG. 20, a variable power lens 1165 identical to that in the sensor head 1137 is mounted in advance on the objective lens side of the CCD 1136. The variable power lens 1165 is attached/detached in accordance with insertion/withdrawal of the variable power lens 1165 in the sensor head 1137.

In this embodiment, both a focus detection optical system and an observation optical system include variable power lenses which can be inserted/withdrawn on/from the optical path. These variable power lenses have the same magnification. This makes it possible for the focus detection optical system and observation optical system to change their magnifications to the same magnification. Therefore, no focus drift difference occurs due to changes in temperature of the focus detection optical system and observation optical system, and the current magnification can be changed to a desired observation magnification. This makes it possible to stably maintain the focus and change the current magnification to a desired observation magnification.

Since an LD 1145 and PD 1149 are kept at positions conjugate to an image plane even when the variable power lens 1165 in the sensor head 1137 is inserted/withdrawn on/from the optical path, other arrangements and functions are almost the same as those in the seventh embodiment.

However, when the variable power lens 1165 is inserted/withdrawn, the NA of a laser light beam on the PD 1149 changes, and the total magnification changes. It is therefore necessary to change parameters for focus detection. For this reason, the control unit 1138 detects the insertion/withdrawal of the variable power lens 1165 by the motor 1177 through a sensor (not shown), and automatically sets optimal parameters for focus detection. Even if the current magnification is changed to a desired observation magnification, optimal focus detection can be done.

According to the above arrangement and function, the observation magnification can be changed without changing the objective lens, and the focus can be maintained stably.

12th Embodiment

Figure 22:
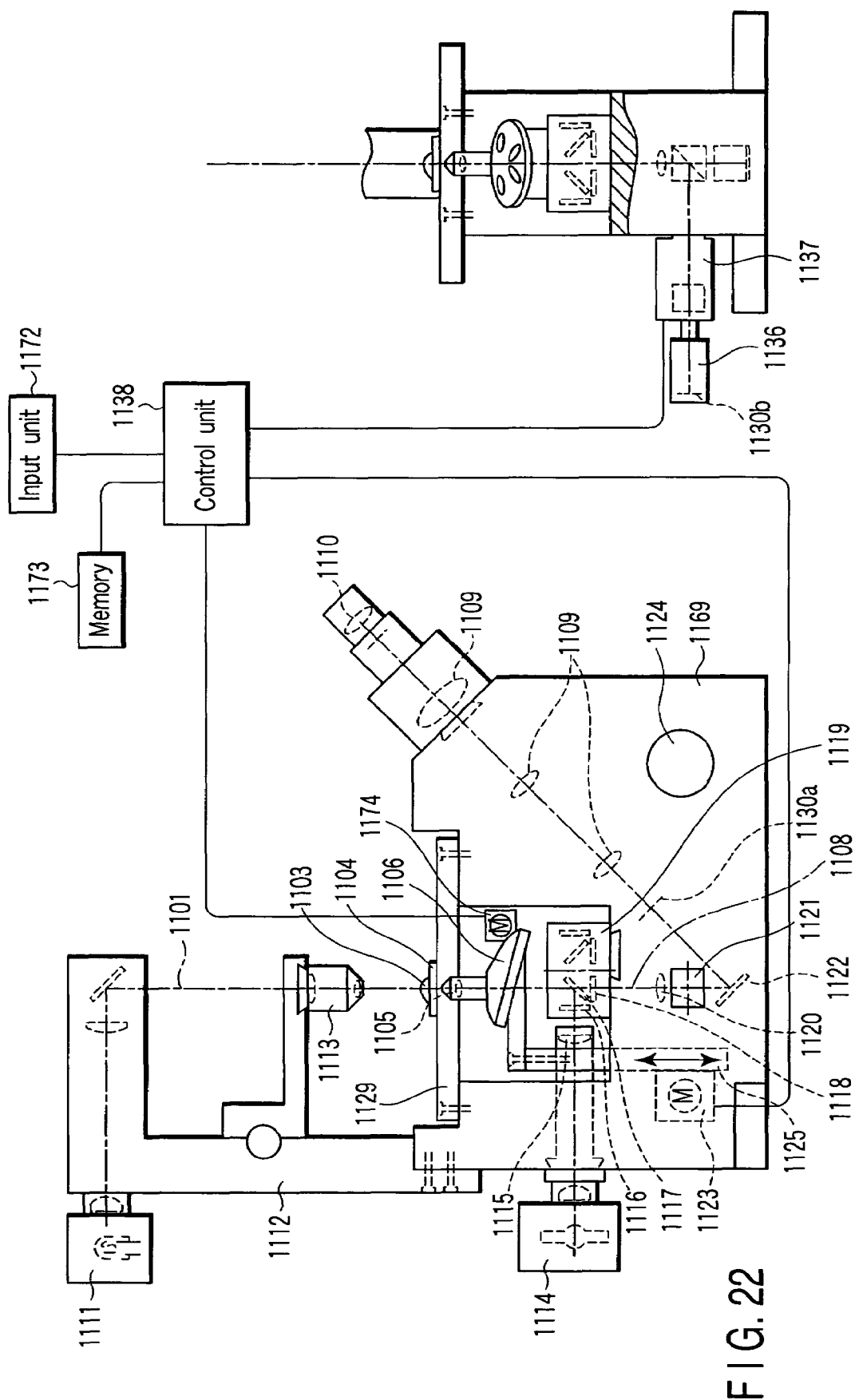
FIG. 22 is a view showing the overall arrangement of a microscope according to the 12th embodiment of the present invention.
Figure 23A:
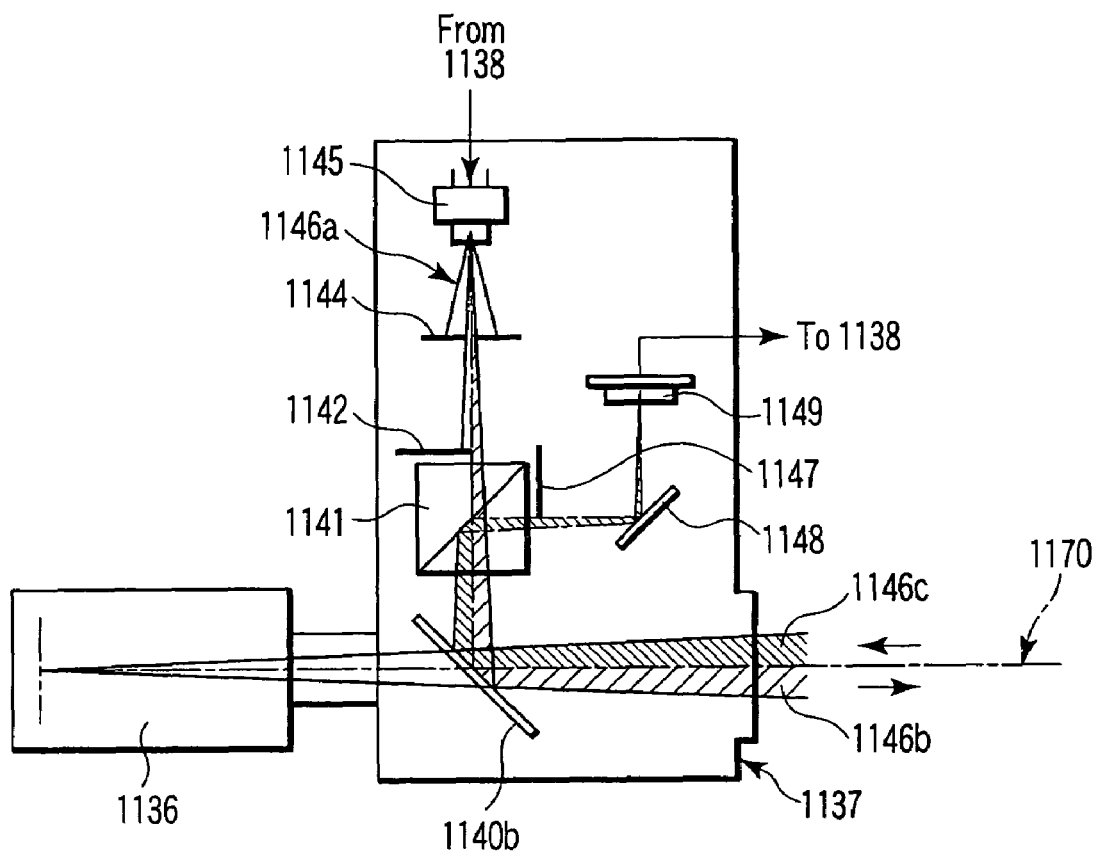
FIG. 23A is a plan view of a sensor head shown on the right side of FIG. 22.
Figure 23B:
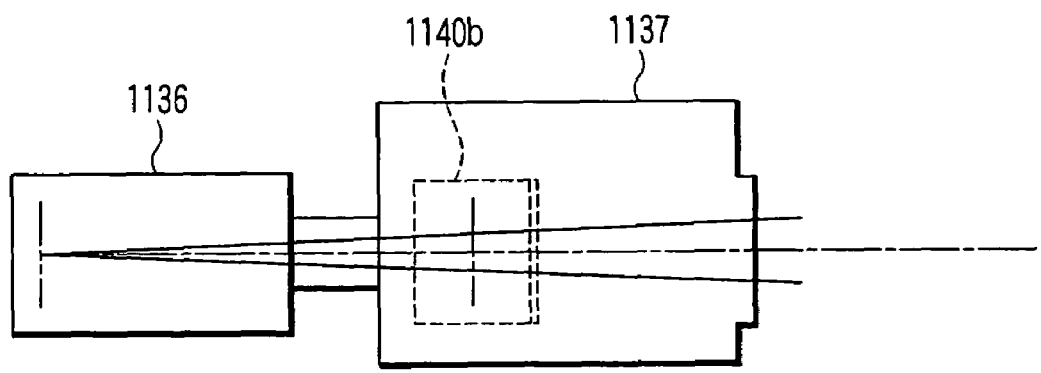
FIG. 23B is a front view of the sensor head shown in FIG. 23A.

The 12th embodiment of the present invention will be described next with reference to FIGS. 22, 23A, and 23B. This embodiment is directed to a microscope comprising a microscope focus maintaining device. FIG. 22 shows the overall arrangement of the microscope according to the 12th embodiment of the present invention. FIG. 22 shows a side surface of the microscope on the left side, together with portions around the objective lens of the microscope on the right side. FIG. 23A is a plan view of a sensor head shown on the right side in FIG. 22. FIG. 23B is a front view of the sensor head shown in FIG. 23A.

Referring to FIG. 22, the microscope portion has an arrangement equivalent to that of the seventh embodiment except that the revolver, the stage, the raising members for the transmitted illumination pillar, and the dichroic mirror switching unit are removed. That is, other arrangements and functions are almost the same as those of the seventh embodiment.

Note, however, this embodiment differs from the seventh embodiment in that a CCD 1136 is not directly mounted on the microscope body but is mounted through a sensor head 1137.

The sensor head 1137 in this embodiment differs from that in the seventh embodiment in the following points. The sensor head itself guides light from an optical path closer to the image side than an imaging lens 1120 incorporated in the microscope. The imaging lens 1120 therefore also has a function of collimating a laser light beam, and no imaging lens exists in the sensor head 1137. In addition, the CCD 1136 is mounted on a sensor head optical axis 1170, and a mirror 1140b is a dichroic mirror which reflects laser light on the sensor head side and transmits observation light toward the CCD 1136. For the sake of descriptive convenience, a beam diameter restriction stop 1144 is fixed. Other arrangements and functions are the same as those in the seventh embodiment.

According to the arrangement and function described above, no raising members such as a stage are required, and an imaging lens is shared for focus detection and observation. Therefore, the above device can be easily formed at low cost and can be easily mounted on the microscope afterward.

13th Embodiment

Figure 24:
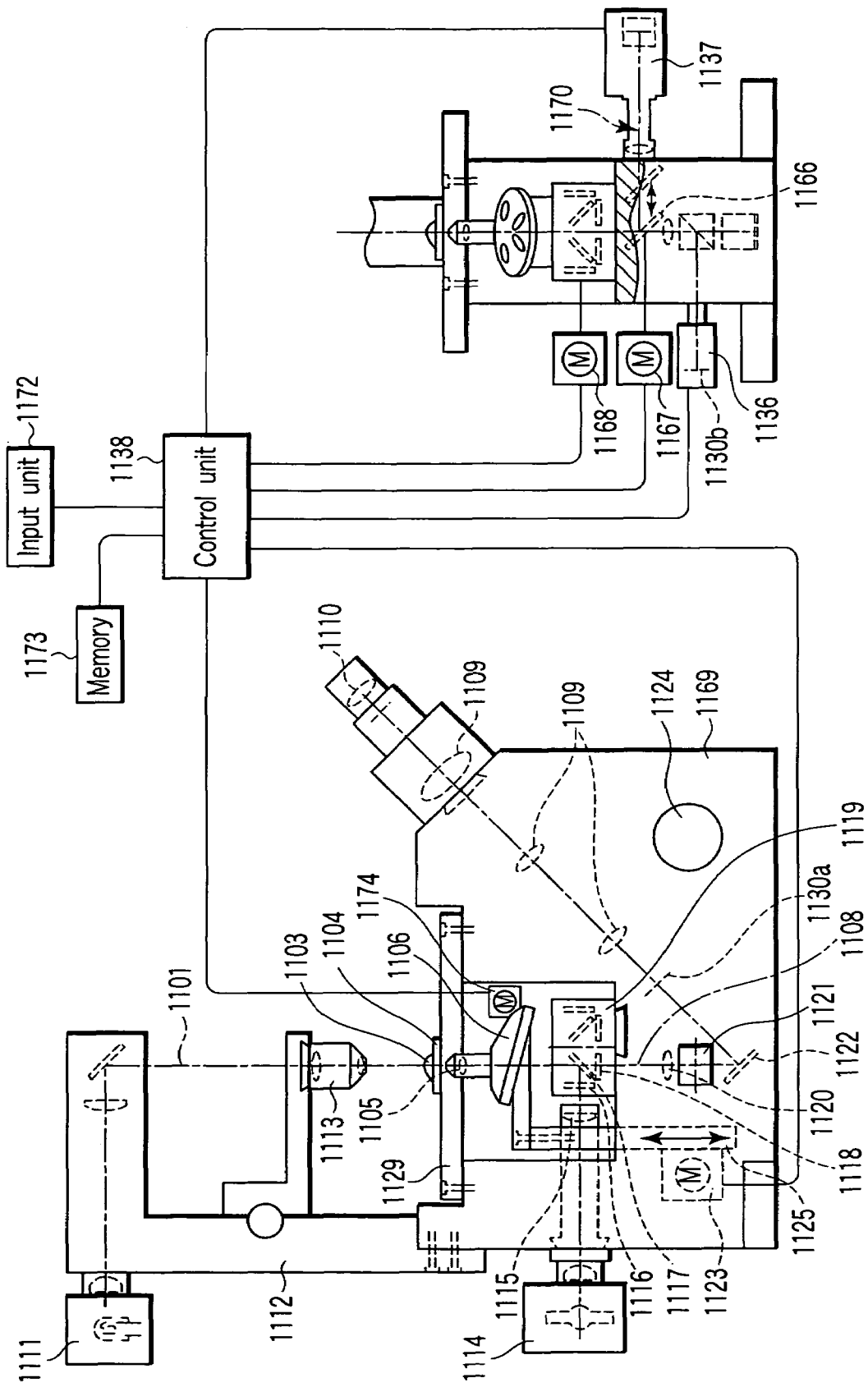
FIG. 24 is a view showing the overall arrangement of a microscope according to the 13th embodiment of the present invention.

The 13th embodiment of the present invention will be described next with reference to FIG. 24. This embodiment is directed to a microscope comprising a microscope focus maintaining device. FIG. 24 shows the overall arrangement of the microscope according to the 13th embodiment of the present invention. FIG. 24 shows a side surface of the microscope on the left side, together with portions around the objective lens of the microscope on the right side.

The microscope portion shown in FIG. 24 in this embodiment differs from that in the 12th embodiment in the following points. A fluorescence filter cassette 1119 can be switched by a motor 1168. Light from a sensor head 1137 is guided from the right side through a dichroic mirror 1166 between the fluorescence filter cassette 1119 and an imaging lens 1120. In addition, the dichroic mirror 1166 can be switched by a motor 1167. A CCD 1136 is directly mounted on a microscope body 1169. Other arrangements and functions are the same as those in the 12th embodiment. Note that the sensor head 1137 is identical to that in the seventh embodiment which is shown in FIGS. 15A and 15B.

According to this embodiment, in the above arrangement, a control unit 1138 inserts the dichroic mirror 1166 on the optical path and withdraws the fluorescence filter from the optical path when focus detection is to be performed. When exposure on the CCD 1136 is to be performed, the control unit 1138 withdraws the dichroic mirror 1166 from the optical path and inserts the fluorescence filter necessary for observation on the optical path.

In a conventional focus maintaining device, a light guide element which guides focus detection light to an observation optical path is always located on the optical path. The light guide element is unnecessary in period other than a focus detection period, and causes a loss of observation light. In fluorescence observation, in particular, observation light is weak, and hence even a slight loss of observation light needs to be avoided in order to realize observation with as high contrast as possible. In addition, when fluorescence photography is to be performed with a CCD or the like, a loss of observation light will prolong the exposure time, resulting in quick deterioration in the color of a fluorescent dye. This also increases damage to a cell if it is living.

In this embodiment, the dichroic mirror 1166 is located on the optical path only when focus detection is to be performed. This reduces a loss of observation light, and hence allows observation with high contrast.

It is more preferable to allow selection of whether to enable/disable the operation of locating the dichroic mirror 1166 on the optical path only at the time of focus detection. This makes it possible to select whether to sacrifice vibrations or a loss of time caused by insertion/withdrawal of the dichroic mirror 1166 or to sacrifice a loss of observation light due to the dichroic mirror 1166. This selection should be made in consideration of the purpose of an experiment.

It is further preferable to automatically determine whether to enable/disable the operation of locating the dichroic mirror 1166 on the optical path only at the time of focus detection, upon switching of objective lenses and microscopic examination methods, on the basis of the types of objective lens and microscopic examination method. When, for example, transmitted observation is to be performed with a high-magnification objective lens, since the brightness of an observation image is sufficient, priority may be given to the elimination of the influences of a loss of time and vibrations on a deterioration in image quality. When fluorescence observation is to be performed with a low-magnification objective lens, since the influence of vibrations is small because of the low magnification and an observation image is dark, priority may be given to the minimization of a loss of fluorescence. This eliminates the necessity to change settings during an experiment, and hence achieves labor saving in the experiment.

According to the above arrangement and function, since the dichroic mirror 1166 is withdrawn from the optical path during CCD exposure, even a slight loss of observation light due to the dichroic mirror can be prevented. In addition, when IR light with a wavelength of 800 nm or more is to be observed, observation can be done without reflection of light by a dichroic mirror. Furthermore, since the fluorescence filter is withdrawn from the optical path during focus detection, a loss of laser light due to the fluorescence filter can be minimized. When a filter which does not transmit laser light with a wavelength of 800 nm, e.g., a filter for IR fluorescence observation or bandpass barrier filter, is used, since the fluorescence filter is withdrawn from the optical path, there is no possibility that any laser light is cut.

Note that when a laser microscope device or disk scan device is mounted in place of an epi-fluorescence emitting tube 1115 in this embodiment, a mirror is mounted in place of a fluorescence filter. In this case as well, the same effects can be obtained owing to a function similar to the fluorescence filter. In addition, when a laser microscope device is mounted on a portion where the CCD 1136 is mounted, and two-photon excitation is to be performed, excitation light with a wavelength of about 800 nm to 1,100 nm is used. If the dichroic mirror 1166 is withdrawn from the optical path while a laser light beam is scanned to acquire an image with the laser microscope as in the case of exposure on the CCD 1136, there is no possibility that any excitation light is cut by the dichroic mirror 1166.

14th Embodiment

Figure 25:
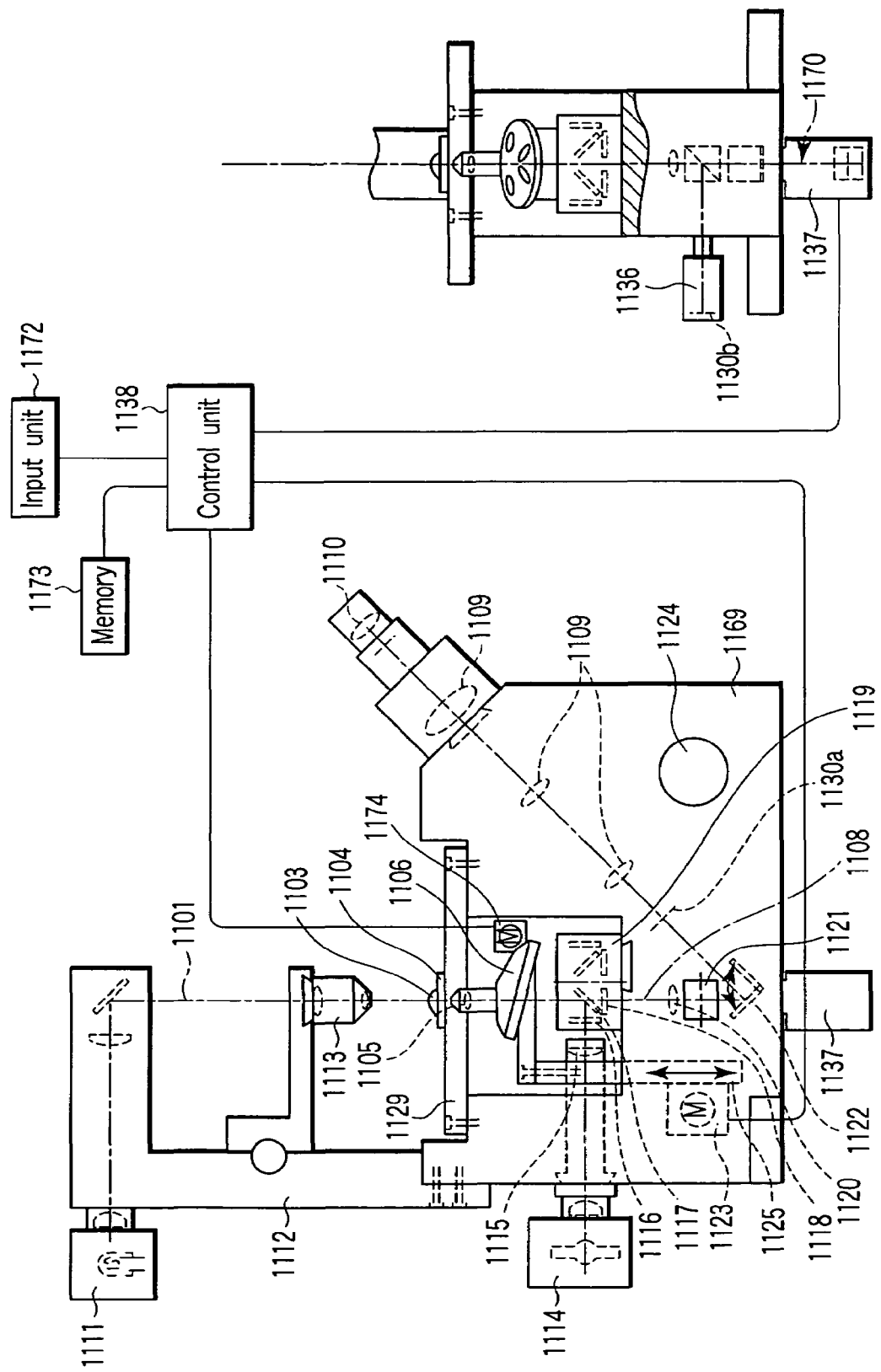
FIG. 25 is a view showing the overall arrangement of a microscope according to the 14th embodiment of the present invention.

The 14th embodiment of the present invention will be described next with reference to FIGS. 25, 26A, and 26B. This embodiment is directed to a microscope comprising a microscope focus maintaining device. FIG. 25 shows the overall arrangement of the microscope according to the 14th embodiment of the present invention. FIG. 25 shows a side surface of the microscope on the left side, together with portions around the objective lens of the microscope on the right side. FIG. 26A is a side view of a sensor head shown on the right side of FIG. 25. FIG. 26B is a front view of the sensor head shown in FIG. 26A.

The microscope portion shown in FIG. 25 in this embodiment differs from that in the 13th embodiment in the following points. A sensor head 1137 from which light is guided from between a fluorescence filter and an imaging lens is mounted on a bottom board below a mirror 1122 on an observation optical axis 1108. This makes it possible to omit a dichroic mirror between the fluorescence filter and the imaging lens and a switching mechanism for the mirror. Instead, the mirror 1122 is switched between an optical path on the sensor head 1137 side and an observation optical path for the eyes by a motor (not shown). For the sake of descriptive convenience, a fluorescence mirror cassette is operated manually instead of being motor-driven. As shown in FIGS. 26A and 26B, the sensor head 1137 is the same as that in the 12th embodiment except that the CCD 1136 is removed and a general mirror 1140 is used in place of the mirror 1140b which is a dichroic mirror.

According to the above arrangement and function, since the sensor head 1137 is mounted on the bottom board, other peripheral devices of the microscope can be freely arranged without being hindered by the sensor head unlike in the seventh to 13th embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A microscope system comprising:
a stage which is adapted to have an observation sample, including an observation object and a transparent member, placed thereon;
an objective lens which is positioned to face the observation sample placed on the stage;
a focusing driving unit which moves at least one of the stage and the objective lens to perform a focusing operation; and
an autofocus unit which controls the focusing driving unit by a Through-the-Lens system to perform autofocusing for the transparent member;
wherein the autofocus unit comprises:
a laser light source which emits a laser light beam for focus detection;
a beam diameter changing unit which changes a diameter of the laser light beam; and
a power changing unit which changes a power of the laser light source; and
wherein after the autofocusing is performed for the transparent member, the focusing driving unit performs offset driving to move at least one of the stage and the objective lens by a predetermined constant amount with respect to each other.

2. A system according to claim 1, wherein the predetermined constant amount is a difference between: (i) a distance between the stage and the objective lens upon completion of autofocusing and (ii) a distance between the stage and the objective lens upon completion of a focus adjustment which is set in advance by performing autofocusing for the transparent member and focus adjustment for the observation object.

3. A system according to claim 1, wherein the autofocusing is performed in a same direction as a direction of the offset driving.

4. A system according to claim 1, further comprising:
an X-Y stage driving unit which drives and controls the stage in a direction perpendicular to an observation optical axis;
wherein a respective said predetermined constant amount is set for each of a plurality of stage X-Y addresses positioned in advance by the X-Y stage driving unit.

5. A system according to claim 1, wherein the microscope system comprises a plurality of interchangeable objective lenses, and a respective said predetermined constant amount is set for each of the objective lenses to be positioned to face the observation sample.

6. A system according to claim 1, further comprising:
an illumination optical system for fluorescence observation which is adapted to selectively apply excitation light beams with different wavelengths to the observation object;
whereon a respective said predetermined constant amount is set for each of the excitation light beams with different wavelengths selected to be applied to the observation object by the illumination optical system for fluorescence observation.

7. A system according to claim 1, wherein the transparent member includes an autofocus mark provided on a part thereof in advance to improve autofocus precision, and the autofocusing is performed for the autofocus mark.

8. A system according to claim 1, wherein the transparent member comprises a cover glass which is positioned between the objective lens and the observation object.

9. A system according to claim 8, wherein the observation object is located on the cover glass, and the objective lens is located below the cover glass.

10. A system according to claim 8, wherein the observation sample further includes a slide glass, the observation object is located between the slide glass and the cover glass, and the objective lens is located above the cover glass.

11. A system according to claim 1, wherein the transparent member comprises a slide glass, the observation object is located on the slide glass, and the objective lens is located above the slide glass.

12. A system according to claim 1, wherein the beam diameter changing unit includes a plurality of beam diameter restriction stops, and a stop control unit which selectively places one of the beam diameter restriction stops on an optical path of the laser light beam,
   wherein the microscope system comprises a plurality of objective lenses, and the objective lens positioned to face the observation sample is selected from the plurality of objective lenses, and
   wherein each of the beam diameter restriction stops has an opening with a diameter that coincides with a pupil diameter of a corresponding one of the plurality of objective lenses.

13. A system according to claim 1, wherein the beam diameter changing unit changes the laser light beam diameter so as to make the laser light beam diameter equal to a pupil diameter of the objective lens.

14. A system according to claim 1, wherein the power changing unit changes the power of the laser light source so as to keep a power of the laser light beam striking the objective lens constant regardless of a change in laser light beam diameter.

15. A system according to claim 13, wherein the power changing unit changes the power of the laser light source so as to keep a power of the laser light beam striking the objective lens constant regardless of a change in laser light beam diameter.

16. A system according to claim 1, wherein the microscope system includes an epi-fluorescence illumination system for fluorescence observation, and wherein the laser light beam for focus detection is guided from a side closer to the objective lens than the epi-fluorescence illumination system.

17. A system according to claim 16, wherein a wavelength of the laser light beam for focus detection differs from a wavelength of light used for fluorescence observation.

18. A system according to claim 17, wherein the epi-fluorescence illumination system includes a fluorescence filter cassette, and a light guide element which guides the laser light beam for focus detection to the objective lens is located between the objective lens and the fluorescence filter cassette.

19. A system according to claim 18, wherein the light guide element comprises a dichroic mirror which reflects a first one of the laser light beam used for focus detection and the light used for fluorescence observation and transmits a second one of the laser light beam used for focus detection and the light used for fluorescence observation.

* * * * *